(12) United States Patent
Graham et al.

(10) Patent No.: US 11,613,003 B2
(45) Date of Patent: Mar. 28, 2023

(54) LINE ASSEMBLY FOR AN EXTENSION TOOL HAVING A PLURALITY OF LINKS

(71) Applicants: General Electric Company, Schenectady, NY (US); Oliver Crispin Robotics Limited, Altrincham (GB)

(72) Inventors: Andrew Crispin Graham, Badminton (GB); Tim Henri Ann Francois, Emersons Green (GB); Hendrik Pieter Jacobus de Bock, Clifton Park, NY (US); Michael Robert Millhaem, Cincinnati, OH (US)

(73) Assignees: General Electric Company, Schenectady, NY (US); Oliver Crispin Robotics Limited, Altrincham (GB)

( * ) Notice: Subject to any disclaimer, the term of this patent is extended or adjusted under 35 U.S.C. 154(b) by 171 days.

(21) Appl. No.: 16/751,802

(22) Filed: Jan. 24, 2020

(65) Prior Publication Data

US 2021/0229270 A1    Jul. 29, 2021

(51) Int. Cl.
*B25J 9/10* (2006.01)
*B25J 18/02* (2006.01)
(Continued)

(52) U.S. Cl.
CPC .............. *B25J 9/106* (2013.01); *B25J 9/06* (2013.01); *B25J 9/1045* (2013.01); *B25J 18/02* (2013.01); *B25J 18/06* (2013.01)

(58) Field of Classification Search
CPC ..... B25J 9/06; B25J 9/065; B25J 9/104; B25J 9/1045; B25J 9/106; B25J 18/02;
(Continued)

(56) References Cited

U.S. PATENT DOCUMENTS

| 338,310 A | 3/1886 | Smith |
| 1,774,986 A | 9/1930 | Philip |

(Continued)

FOREIGN PATENT DOCUMENTS

| CA | 2960352 A1 | 9/2017 |
| CA | 3077622 A1 | 4/2019 |

(Continued)

OTHER PUBLICATIONS

European Search Report Corresponding to EP Application No. 181694589 dated Aug. 21, 2018.

(Continued)

*Primary Examiner* — Joseph Brown
(74) *Attorney, Agent, or Firm* — Fitch, Even, Tabin & Flannery LLP

(57) ABSTRACT

An extension tool includes a plurality of sequentially arranged links moveable relative to one another. The plurality of sequentially arranged links include a first link. The extension tool further includes a line assembly having a line, the line including a first portion extending through the plurality of sequentially arranged links to the first link and a transition portion extending from the first portion through the first link. The extension tool further includes an attachment feature coupled to or formed integrally with the line of the line assembly at the transition portion of the line to support the line in the event of a failure of the line.

21 Claims, 9 Drawing Sheets

(51) Int. Cl.
  *B25J 18/06* (2006.01)
  *B25J 9/06* (2006.01)

(58) Field of Classification Search
  CPC ........ B25J 18/06; A61B 1/0057; A61B 34/71;
  A61B 2017/00323
  USPC .................. 74/490.04; 600/146, 149; 901/21
  See application file for complete search history.

(56) References Cited

U.S. PATENT DOCUMENTS

| | | | |
|---|---|---|---|
| 1,987,972 | A | 1/1935 | Rhein et al. |
| 2,073,903 | A | 3/1937 | O'Neil |
| 2,510,198 | A | 6/1950 | Tesmer |
| 2,974,676 | A | 3/1961 | Hagelthorn |
| 3,096,962 | A | 7/1963 | Johannes |
| 3,190,286 | A | 6/1965 | Stokes |
| 3,266,059 | A | 8/1966 | Stelle |
| 3,270,641 | A | 9/1966 | Gosselin |
| 3,583,393 | A | 6/1971 | Takahashi |
| 3,625,084 | A | 12/1971 | Siebert |
| 3,778,170 | A | 12/1973 | Howell |
| 4,035,137 | A | 7/1977 | Arand |
| 4,041,695 | A | 8/1977 | Harper |
| 4,095,418 | A | 6/1978 | Mansson et al. |
| 4,170,489 | A | 10/1979 | Magnus et al. |
| 4,227,584 | A | 10/1980 | Driver |
| 4,242,863 | A | 1/1981 | Bailey |
| 4,483,326 | A | 11/1984 | Yamaka |
| 4,625,936 | A | 12/1986 | Hadden, Sr. |
| 4,651,718 | A | 3/1987 | Collins |
| 4,703,888 | A | 11/1987 | Kawamura et al. |
| 4,713,120 | A | 12/1987 | Hodgens, II et al. |
| 4,730,960 | A | 3/1988 | Lewis |
| 4,773,395 | A | 9/1988 | Suzuki |
| 4,790,294 | A | 12/1988 | Allred, III et al. |
| 4,790,624 | A | 12/1988 | Van Hoye |
| 4,826,087 | A | 5/1989 | Chinery |
| 4,846,573 | A | 7/1989 | Taylor |
| 4,890,602 | A | 1/1990 | Hake |
| 4,911,206 | A | 3/1990 | Gropp et al. |
| 4,972,048 | A | 11/1990 | Martin |
| 5,090,205 | A | 2/1992 | Foster |
| 5,102,221 | A | 4/1992 | Desgranges |
| 5,203,646 | A | 4/1993 | Landsberger |
| 5,254,809 | A | 10/1993 | Martin |
| 5,271,382 | A | 12/1993 | Chikama |
| 5,323,962 | A | 6/1994 | Jassby |
| 5,337,733 | A | 8/1994 | Bauerfeind |
| 5,339,845 | A | 8/1994 | Huddas |
| 5,372,162 | A | 12/1994 | Frey |
| 5,385,102 | A | 1/1995 | Villedieu |
| 5,390,402 | A | 2/1995 | White |
| 5,399,164 | A * | 3/1995 | Snoke ............ A61M 25/0136 604/524 |
| 5,408,970 | A | 4/1995 | Burkhard |
| 5,482,029 | A | 1/1996 | Sekiguchi |
| 5,501,156 | A | 3/1996 | Richter |
| 5,644,394 | A | 7/1997 | Owens |
| 5,667,023 | A | 9/1997 | Harrell |
| 5,787,897 | A * | 8/1998 | Kieturakis ......... A61B 17/0218 606/1 |
| 5,807,241 | A | 9/1998 | Heimberger |
| 5,816,769 | A | 10/1998 | Bauer et al. |
| 6,123,273 | A | 9/2000 | Loprinzo |
| 6,156,974 | A | 12/2000 | Blase |
| 6,213,974 | B1 * | 4/2001 | Smith ............... A61M 25/0141 604/95.04 |
| 6,216,439 | B1 | 4/2001 | Nakamoto |
| 6,287,206 | B1 | 9/2001 | Stage |
| 6,311,704 | B1 | 11/2001 | Foster |
| 6,371,148 | B1 | 4/2002 | Tripp |
| 6,431,824 | B2 | 8/2002 | Schotsch |
| 6,478,033 | B1 | 11/2002 | Foster |
| 6,481,195 | B1 | 11/2002 | Blase |
| 6,542,230 | B1 | 4/2003 | Luke |
| 6,643,877 | B1 | 11/2003 | Amtenbrink |
| 6,698,456 | B2 | 3/2004 | Neubauer |
| 6,783,491 | B2 | 8/2004 | Saadat |
| 6,837,846 | B2 | 1/2005 | Jaffe |
| 6,941,974 | B2 | 9/2005 | Utaki |
| 6,943,570 | B2 | 9/2005 | Duffy |
| 6,955,023 | B2 | 10/2005 | Rotheroe |
| 6,957,781 | B2 | 10/2005 | Gowens et al. |
| 6,974,411 | B2 | 12/2005 | Belson |
| 7,150,416 | B2 | 12/2006 | Martin et al. |
| 7,171,279 | B2 | 1/2007 | Buckingham |
| 7,182,024 | B2 | 2/2007 | Pfeiffer |
| 7,182,025 | B2 | 2/2007 | Ghorbel |
| 7,185,407 | B2 | 3/2007 | Boyl-Davis |
| 7,258,521 | B2 | 8/2007 | Guerra |
| 7,509,735 | B2 | 3/2009 | Philip |
| 7,559,340 | B2 | 7/2009 | Ikeda et al. |
| 7,571,735 | B2 | 8/2009 | Wagner |
| 7,677,181 | B2 | 3/2010 | Boyl-Davis |
| 7,703,272 | B2 | 4/2010 | Wagner et al. |
| 7,707,704 | B2 | 5/2010 | Crocker |
| 7,712,301 | B1 | 5/2010 | Wagner |
| 7,718,894 | B2 | 5/2010 | Blase |
| 7,741,563 | B2 | 6/2010 | Harada et al. |
| 7,849,878 | B2 | 12/2010 | Kohler et al. |
| 7,854,109 | B2 | 12/2010 | Zubiate |
| 7,883,674 | B2 | 2/2011 | Huang |
| 8,096,030 | B2 | 1/2012 | Graichen |
| 8,125,755 | B2 | 2/2012 | Garcia |
| 8,152,934 | B2 | 4/2012 | Lee et al. |
| 8,206,488 | B2 | 6/2012 | Mantkowski |
| 8,303,243 | B2 | 11/2012 | Fish et al. |
| 8,327,518 | B2 | 12/2012 | Korner |
| 8,374,722 | B2 | 2/2013 | Buckingham |
| 8,377,232 | B2 | 2/2013 | Myers et al. |
| 8,400,501 | B2 | 3/2013 | Heyworth |
| 8,409,248 | B2 | 4/2013 | Ginn |
| 8,453,533 | B2 | 6/2013 | Ryland |
| 8,505,204 | B2 | 8/2013 | Reverchon |
| 8,571,711 | B2 | 10/2013 | Jacobsen et al. |
| 8,635,849 | B2 | 1/2014 | Tassone et al. |
| 8,674,222 | B2 | 3/2014 | Hsieh |
| 8,758,232 | B2 | 6/2014 | Graham et al. |
| 8,920,579 | B2 | 12/2014 | Liedtke |
| 8,945,096 | B2 | 2/2015 | Zubiate |
| 8,959,902 | B2 | 2/2015 | Olivier et al. |
| 8,991,163 | B2 | 3/2015 | Olivier |
| 8,992,421 | B2 | 3/2015 | Stand |
| 8,998,567 | B2 | 4/2015 | Scipio et al. |
| 9,016,159 | B2 | 4/2015 | Kell |
| 9,016,293 | B2 | 4/2015 | Battaglioli et al. |
| 9,028,618 | B2 | 5/2015 | Battaglioli et al. |
| 9,127,234 | B2 | 9/2015 | Hughes et al. |
| 9,149,929 | B2 | 10/2015 | Motzer |
| 9,187,700 | B2 | 11/2015 | Huang et al. |
| 9,220,398 | B2 * | 12/2015 | Woodley ............ G02B 23/2476 |
| 9,263,866 | B2 | 2/2016 | Shimizu |
| 9,294,737 | B2 | 3/2016 | Hatcher, Jr. |
| 9,329,377 | B2 | 5/2016 | Kell |
| 9,399,299 | B2 | 7/2016 | Hermey |
| 9,403,244 | B2 | 8/2016 | Rautenberg |
| 9,409,292 | B2 | 8/2016 | Smith |
| 9,435,750 | B2 | 9/2016 | Matsumoto |
| 9,458,735 | B1 | 10/2016 | Diwinsky |
| 9,492,906 | B2 | 11/2016 | Rosing et al. |
| 9,505,125 | B2 | 11/2016 | Zubiate |
| 9,549,663 | B2 | 1/2017 | Larkin |
| 9,733,195 | B2 | 8/2017 | Colletti |
| 9,788,141 | B2 | 10/2017 | Ponec |
| 9,857,002 | B2 | 1/2018 | Ott et al. |
| 9,902,024 | B2 | 2/2018 | Ernst |
| 9,909,694 | B2 | 3/2018 | Graham et al. |
| 9,951,647 | B2 | 4/2018 | Rawson |
| 10,060,569 | B2 | 8/2018 | Sivacoe |
| 10,085,624 | B2 | 10/2018 | Isoda |
| 10,197,473 | B2 | 2/2019 | Diwinsky |
| 10,213,919 | B2 | 2/2019 | Axinte |
| 10,238,457 | B2 | 3/2019 | Herrell |

(56) References Cited

U.S. PATENT DOCUMENTS

| | | |
|---|---|---|
| 10,265,810 B2 | 4/2019 | Diwinsky |
| 10,428,993 B2 | 10/2019 | Whitefield |
| 10,470,831 B2 | 11/2019 | Cohen |
| 10,884,232 B1 | 1/2021 | Trivedi |
| 10,926,403 B1 | 2/2021 | Asokan |
| 10,962,345 B2 | 3/2021 | Graham |
| 10,967,504 B2 | 4/2021 | Simaan |
| 11,371,437 B2 | 6/2022 | Hawke |
| 11,413,763 B2 | 8/2022 | Lee |
| 2003/0171736 A1 | 9/2003 | Bon |
| 2003/0229420 A1 | 12/2003 | Buckingham |
| 2004/0138525 A1 | 7/2004 | Saadat |
| 2004/0186350 A1 | 9/2004 | Brenneman |
| 2004/0249367 A1 | 12/2004 | Saadat |
| 2004/0255422 A1 | 12/2004 | Reback |
| 2005/0075538 A1 | 4/2005 | Banik |
| 2005/0107667 A1* | 5/2005 | Danitz .................. A61B 34/70 600/139 |
| 2005/0148287 A1 | 7/2005 | Moeller |
| 2005/0203340 A1 | 9/2005 | Butler |
| 2005/0204489 A1 | 9/2005 | Velez, Jr. |
| 2005/0273085 A1 | 12/2005 | Hinman |
| 2006/0073348 A1 | 4/2006 | Farmer et al. |
| 2006/0074283 A1 | 4/2006 | Henderson |
| 2006/0074383 A1 | 4/2006 | Boulais |
| 2006/0131908 A1* | 6/2006 | Tadano .................. B25J 9/104 294/111 |
| 2006/0156851 A1 | 7/2006 | Jacobsen |
| 2006/0170386 A1 | 8/2006 | Anhalt |
| 2006/0258265 A1 | 11/2006 | Moeller |
| 2008/0066821 A1 | 3/2008 | Komiya et al. |
| 2008/0149141 A1 | 6/2008 | Sales |
| 2008/0199304 A1 | 8/2008 | Moran |
| 2008/0250769 A1 | 10/2008 | Wagner et al. |
| 2009/0084108 A1 | 4/2009 | Prociw et al. |
| 2009/0084408 A1 | 4/2009 | Thiemann |
| 2009/0084411 A1 | 4/2009 | Woodcock et al. |
| 2009/0216245 A1 | 8/2009 | Viola |
| 2009/0255102 A1 | 10/2009 | McMasters et al. |
| 2009/0255116 A1 | 10/2009 | McMasters et al. |
| 2009/0256007 A1 | 10/2009 | McMasters et al. |
| 2009/0320891 A1 | 12/2009 | Liedtke |
| 2010/0030377 A1 | 2/2010 | Unsworth |
| 2010/0037924 A1 | 2/2010 | Gebhardt et al. |
| 2010/0108107 A1 | 5/2010 | Mantkowski |
| 2010/0116292 A1 | 5/2010 | Wagner |
| 2010/0147330 A1 | 6/2010 | Kohler et al. |
| 2010/0160736 A1 | 6/2010 | Padget |
| 2010/0256447 A1 | 10/2010 | Dubi |
| 2011/0174108 A1 | 7/2011 | Graham |
| 2011/0303053 A1 | 12/2011 | Schneider |
| 2011/0313243 A1 | 12/2011 | Zubiate |
| 2012/0067158 A1 | 3/2012 | Kell |
| 2012/0125164 A1 | 5/2012 | Kozak |
| 2012/0167547 A1 | 7/2012 | Zhang et al. |
| 2012/0184817 A1 | 7/2012 | Sugiyama |
| 2012/0197241 A1 | 8/2012 | Golden |
| 2012/0260497 A1 | 10/2012 | White |
| 2012/0312103 A1 | 12/2012 | Hannott |
| 2013/0074879 A1 | 3/2013 | Battaglioli et al. |
| 2013/0125753 A1 | 5/2013 | Ono et al. |
| 2013/0192353 A1 | 8/2013 | Hatcher |
| 2013/0199040 A1 | 8/2013 | Matthias |
| 2013/0226033 A1 | 8/2013 | Eskuri |
| 2013/0255410 A1* | 10/2013 | Lee ...................... A61B 1/0055 74/89.22 |
| 2013/0335530 A1 | 12/2013 | Hatcher, Jr. |
| 2013/0340559 A1 | 12/2013 | Danitz |
| 2014/0005683 A1 | 1/2014 | Stand |
| 2014/0012288 A1 | 1/2014 | Darisse |
| 2014/0055596 A1 | 2/2014 | Hatcher, Jr. |
| 2014/0125791 A1 | 5/2014 | Arellano |
| 2014/0260755 A1 | 9/2014 | Dong |
| 2015/0036150 A1 | 2/2015 | Kobayashi |
| 2015/0159557 A1 | 6/2015 | Scipio et al. |
| 2015/0233263 A1 | 8/2015 | Battaglioli et al. |
| 2015/0300920 A1 | 10/2015 | Deascanis |
| 2015/0338353 A1 | 11/2015 | Bancalari |
| 2015/0341600 A1 | 11/2015 | Hatcher, Jr. |
| 2015/0360629 A1 | 12/2015 | Sekino |
| 2016/0032761 A1 | 2/2016 | Griffiths et al. |
| 2016/0040803 A1 | 2/2016 | Steeger |
| 2016/0146036 A1 | 5/2016 | Richter |
| 2016/0174816 A1 | 6/2016 | Choset |
| 2016/0186602 A1 | 6/2016 | Saenz |
| 2016/0339584 A1 | 11/2016 | Esteban Finck |
| 2017/0023154 A1 | 1/2017 | Jaeker |
| 2017/0095922 A1 | 4/2017 | Licht |
| 2017/0100197 A1 | 4/2017 | Zubiate |
| 2017/0129110 A1 | 5/2017 | Ohm et al. |
| 2017/0167289 A1 | 6/2017 | Diwinsky |
| 2017/0167953 A1 | 6/2017 | Diwinsky |
| 2017/0175569 A1 | 6/2017 | Rawson |
| 2017/0191376 A1 | 7/2017 | Eriksen et al. |
| 2017/0219814 A1 | 8/2017 | Letter |
| 2017/0219815 A1 | 8/2017 | Letter |
| 2017/0239762 A1 | 8/2017 | Roberts |
| 2017/0274484 A1 | 9/2017 | Roberts |
| 2017/0319048 A1 | 11/2017 | Ikeda |
| 2017/0328497 A1 | 11/2017 | Dantin |
| 2017/0361470 A1 | 12/2017 | Otero Del Real |
| 2018/0058233 A1 | 3/2018 | Norton |
| 2018/0094538 A1 | 4/2018 | Tibbetts et al. |
| 2018/0119568 A1 | 5/2018 | Negoescu |
| 2018/0149038 A1 | 5/2018 | Eriksen |
| 2018/0156062 A1 | 6/2018 | Dede |
| 2018/0156132 A1 | 6/2018 | Dede |
| 2018/0231162 A1 | 8/2018 | Zeng |
| 2018/0313225 A1 | 11/2018 | Millhaem et al. |
| 2018/0361960 A1 | 12/2018 | Yamamoto |
| 2019/0022877 A1 | 1/2019 | Akin |
| 2019/0046010 A1 | 2/2019 | Tojo |
| 2019/0054638 A1* | 2/2019 | Norton ...................... B25J 9/06 |
| 2019/0190190 A1 | 6/2019 | Bourgeas |
| 2019/0246878 A1 | 8/2019 | Bodner |
| 2019/0277770 A1 | 9/2019 | Mekala |
| 2019/0308319 A1 | 10/2019 | Walters |
| 2019/0358833 A1 | 11/2019 | Graham |
| 2019/0360794 A1 | 11/2019 | Graham |
| 2019/0366536 A1 | 12/2019 | Graham |
| 2019/0383158 A1 | 12/2019 | Diwinsky |
| 2019/0383161 A1 | 12/2019 | Graham |
| 2020/0113412 A1* | 4/2020 | Jensen ................ A61B 1/0011 |
| 2020/0114497 A1* | 4/2020 | Graham ................ B23B 51/00 |
| 2020/0114528 A1* | 4/2020 | Graham ................ B25J 18/02 |
| 2020/0224552 A1 | 7/2020 | Millhaem |
| 2020/0316789 A1 | 10/2020 | Sohmshetty |
| 2020/0319119 A1 | 10/2020 | Peters |
| 2020/0359879 A1* | 11/2020 | Cahill ...................... A61B 1/05 |
| 2020/0405142 A1 | 12/2020 | Whitaker |
| 2021/0102870 A1 | 4/2021 | Trivedi |
| 2021/0137354 A1* | 5/2021 | Bob ...................... A61B 1/0057 |
| 2021/0223142 A1 | 7/2021 | Sasaki |
| 2021/0285374 A1 | 9/2021 | Hawke |
| 2021/0388737 A1 | 12/2021 | Foxall |
| 2022/0221706 A1 | 7/2022 | Trivedi |
| 2022/0221707 A1 | 7/2022 | Trivedi |
| 2022/0290608 A1 | 9/2022 | Hawke |
| 2022/0314430 A1 | 10/2022 | Graham |

FOREIGN PATENT DOCUMENTS

| | | |
|---|---|---|
| CA | 3043720 A1 | 11/2019 |
| CN | 86101283 A | 8/1986 |
| CN | 1050781 C | 3/2000 |
| CN | 1656312 | 8/2005 |
| CN | 101528111 A | 9/2009 |
| CN | 101881218 | 11/2010 |
| CN | 201800016 | 4/2011 |
| CN | 102292013 A | 12/2011 |
| CN | 102711585 | 10/2012 |
| CN | 203370761 U | 1/2014 |
| CN | 103895012 A | 7/2014 |
| CN | 104582909 A | 4/2015 |

(56) References Cited

FOREIGN PATENT DOCUMENTS

| | | | |
|---|---|---|---|
| CN | 103639156 B | | 7/2015 |
| CN | 105436127 A | | 3/2016 |
| CN | 106163431 | | 11/2016 |
| CN | 106427289 A | | 2/2017 |
| CN | 106659438 | | 5/2017 |
| CN | 106988798 | | 7/2017 |
| CN | 107468339 A | | 12/2017 |
| CN | 108472025 | | 8/2018 |
| CN | 109068938 | | 12/2018 |
| CN | 110001286 | | 7/2019 |
| DE | 29902753 U | | 6/1999 |
| EP | 1216797 A1 | | 6/2002 |
| EP | 1489269 A2 | | 12/2004 |
| EP | 1574675 A2 | | 9/2005 |
| EP | 2011619 A2 | | 1/2009 |
| EP | 1914010 A3 | | 9/2010 |
| EP | 2237931 A1 | | 10/2010 |
| EP | 2267508 | | 12/2010 |
| EP | 1967295 B1 | | 1/2011 |
| EP | 2320262 | | 5/2011 |
| EP | 2052792 A3 | | 6/2011 |
| EP | 2353739 A1 | | 8/2011 |
| EP | 2286933 B1 | | 11/2011 |
| EP | 2275648 B1 | | 3/2012 |
| EP | 1903188 B1 | | 5/2013 |
| EP | 2597273 A2 | | 5/2013 |
| EP | 2629655 | | 8/2013 |
| EP | 3061923 A1 | | 8/2016 |
| EP | 3072642 A2 | | 9/2016 |
| EP | 1908928 B1 | | 12/2016 |
| EP | 3153604 A1 | | 4/2017 |
| EP | 3176365 A1 | | 6/2017 |
| EP | 3572632 A1 | | 11/2019 |
| FR | 2995996 A1 | | 3/2014 |
| FR | 3082136 A1 | | 12/2019 |
| GB | 779248 | | 7/1957 |
| GB | 1437405 A | | 5/1976 |
| GB | 2199842 | | 7/1988 |
| GB | 2228644 A | | 8/1990 |
| JP | 2013510339 A | | 3/2013 |
| MX | 2010013223 A1 | | 12/2010 |
| WO | 0006336 A1 | | 2/2000 |
| WO | 2009081164 A1 | | 7/2009 |
| WO | 2011092891 | | 8/2011 |
| WO | 2012042921 A1 | | 4/2012 |
| WO | 2012054829 A2 | | 4/2012 |
| WO | 2018001967 A1 | | 1/2018 |
| WO | 2019076876 | | 4/2019 |
| WO | 2019097688 | | 5/2019 |
| WO | 2021040376 A1 | | 3/2021 |

OTHER PUBLICATIONS

Huang et al., In-Situ Continuous Coke Deposit Removal by Catalytic Steam Gasification for Fuel-Cooled Thermal Management, Journal of Engineering for Gas Turbines and Power, vol. 134, Oct. 2012, 8 Pages.
Wickham et al., High Heat Flux Surface Coke Deposition and Removal Assessment, Technical Paper, Air Force Research Laboratory, Edwards AFB, Jan. 2015, California, 21 Pages.
U.S. Appl. No. 16/577,331; Notice of Allowance and Fees Due (PTOL-85) dated Jul. 25, 2022; (pp. 1-5).
U.S. Appl. No. 16/735,191; Non-Final Rejection dated Aug. 3, 2022; (pp. 1-11).
U.S. Appl. No. 16/750,665; Non-Final Rejection dated Jul. 20, 2022; (pp. 1-9).
Mascarenas et al., "A Compliant Mechanism for Inspecting Extremely Confined Spaces" Smart Materials and Structures, vol. No. 26, pp. 1-16, Oct. 26, 2017.
FET20 (Wireless Borescope, Klein Tools, Jan. 2019) (Year: 2019).
Mascarenas, et al., A compliant mechanism for inspecting extremely confined spaces, Smart Materials and Structures, Oct. 26, 2017, vol. 26, pp. 1-16.
U.S. Appl. No. 17/144,487; Non-Final Rejection dated Aug. 23, 2022; (pp. 1-6).
U.S. Appl. No. 16/696,025; Final Rejection dated Sep. 16, 2022; (pp. 1-34).
U.S. Appl. No. 16/696,025, filed Nov. 26, 2019.
U.S. Appl. No. 16/750,665, filed Jan. 23, 2020.
U.S. Appl. No. 16/750,743, filed Jan. 23, 2020.
U.S. Appl. No. 16/751,802, filed Jan. 24, 2020.
U.S. Appl. No. 16/813,829, filed Mar. 10, 2020.
U.S. Appl. No. 16/898,629, filed Jun. 11, 2020.
U.S. Appl. No. 17/144,487, filed Jan. 8, 2021.
U.S. Appl. No. 15/986,958, filed May 23, 2018.
U.S. Final Office Action from U.S. Appl. No. 15/986,958 dated Sep. 9, 2020, 10 pgs.
U.S. Non-Final Office Action from U.S. Appl. No. 15/986,958 dated Apr. 23, 2020, 12 pgs.
U.S. Notice of Allowance and Notice of Allowability, dated Nov. 18, 2020, from U.S. Appl. No. 15/986,958, 9 pgs.
U.S. Appl. No. 16/751,802; Non-Final Rejection dated Feb. 28, 2022; (pp. 1-12).
USPTO; U.S. Appl. No. 16/750,743; Non-Final Rejection dated Apr. 27, 2022; (pp. 1-12).
USPTO; U.S. Appl. No. 16/577,331; Non-Final Rejection dated Jan. 19, 2022; (pp. 1-8).
USPTO; U.S. Appl. No. 16/577,331; Notice of Allowance and Fees Due (PTOL-85) dated Nov. 7, 2022; (pp. 1-5).
USPTO; U.S. Appl. No. 16/577,331; Notice of Allowance and Fees Due (PTOL-85) dated Nov. 7, 2022; (pp. 1-16).
USPTO; U.S. Appl. No. 16/750,665; Notice of Allowance and Fees Due (PTOL-85) dated Nov. 17, 2022; (pp. 1-5).
USPTO; U.S. Appl. No. 16/750,743; Final Rejection dated Nov. 7, 2022; (pp. 1-13).
USPTO; U.S. Appl. No. 16/750,743; Final Rejection dated Nov. 7, 2022; (pp. 1-28).
USPTO; U.S. Appl. No. 16/898,629; Non-Final Rejection dated Sep. 13, 2022; (pp. 1-14).
USPTO; U.S. Appl. No. 16/735,191; Notice of Allowance and Fees Due (PTOL-85) dated Dec. 8, 2022; (pp. 1-8).
USPTO; U.S. Appl. No. 17/219,577; Notice of Allowance and Fees Due (PTOL-85) dated Jan. 4, 2023; (pp. 1-5).
USPTO; U.S. Appl. No. 17/144,487; Final Rejection dated Jan. 11, 2023; (pp. 1-5).
USPTO; U.S. Appl. No. 16/577,268; Non-Final Rejection dated Jan. 20, 2023; (pp. 1-29).
USPTO; U.S. Appl. No. 16/750,743; Notice of Allowance and Fees Due (PTOL-85) dated Jan. 23, 2023; (pp. 1-5).

* cited by examiner

LINE ASSEMBLY FOR AN EXTENSION TOOL HAVING A PLURALITY OF LINKS

FIELD

The present subject matter relates generally to a line assembly for an extension tool having a plurality of links.

BACKGROUND

Robotic arm assemblies are useful throughout various industries for performing operations at, e.g., remote locations, hazardous locations, etc. At least certain robotic arm assemblies include a robotic arm formed of a plurality of links joined together at respective joints. Additionally, a plurality of control wires may extend through the robotic arm, with each wire terminating at an individual link for moving such link relative to an aft-adjacent link. The control wires may be coupled to one or more motors within a base of the robotic arm assembly, such that the robotic arm assembly may control a movement of the robotic arm by increasing and/or decreasing tension on the plurality of control wires.

In such a manner, robotic arms may be useful in reaching out-of-sight locations within various environments. However, robotic arms may generally be cost prohibitive and/or more complicated than desired for certain applications. Accordingly, a tool that may allow for a user to reach remote locations within an environment in a more cost efficient manner would be useful.

BRIEF DESCRIPTION

Aspects and advantages of the invention will be set forth in part in the following description, or may be obvious from the description, or may be learned through practice of the invention.

In one exemplary embodiment of the present disclosure, an extension tool is provided including a plurality of sequentially arranged links moveable relative to one another. The plurality of sequentially arranged links include a first link. The extension tool further includes a line assembly having a line, the line including a first portion extending through the plurality of sequentially arranged links to the first link and a transition portion extending from the first portion through the first link. The extension tool further includes an attachment feature coupled to or formed integrally with the line of the line assembly at the transition portion of the line to support the line in the event of a failure of the line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
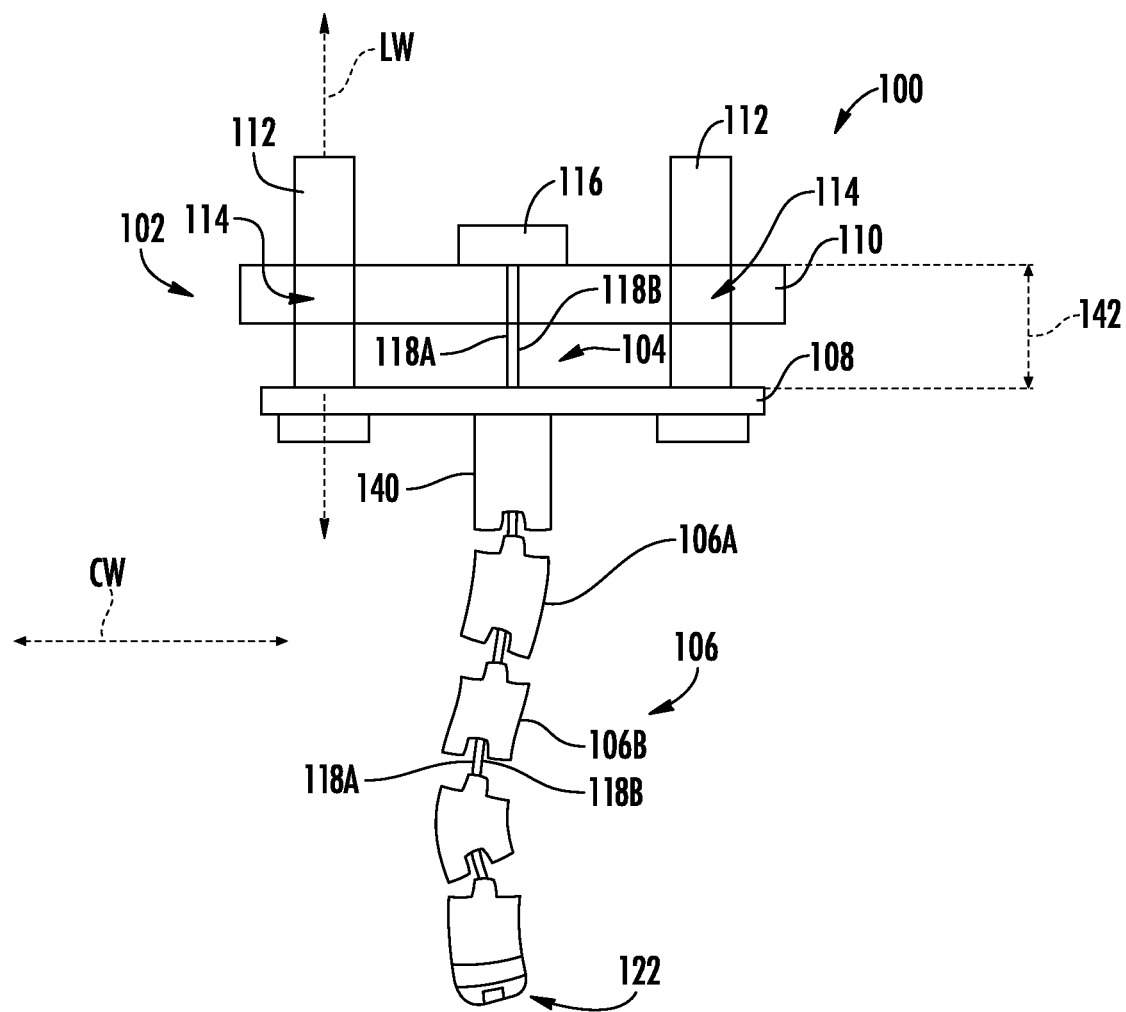
FIG. 1 is a schematic view of an extension tool in accordance with an exemplary embodiment of the present disclosure in a slacked position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions of a component or system, and refer to the normal operational attitude of the component or system. For example, with regard to an extension tool in accordance with one or more the present embodiments, forward refers to a position closer to a distal end of the extension tool and aft refers to a position closer to a root end of the extension tool.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
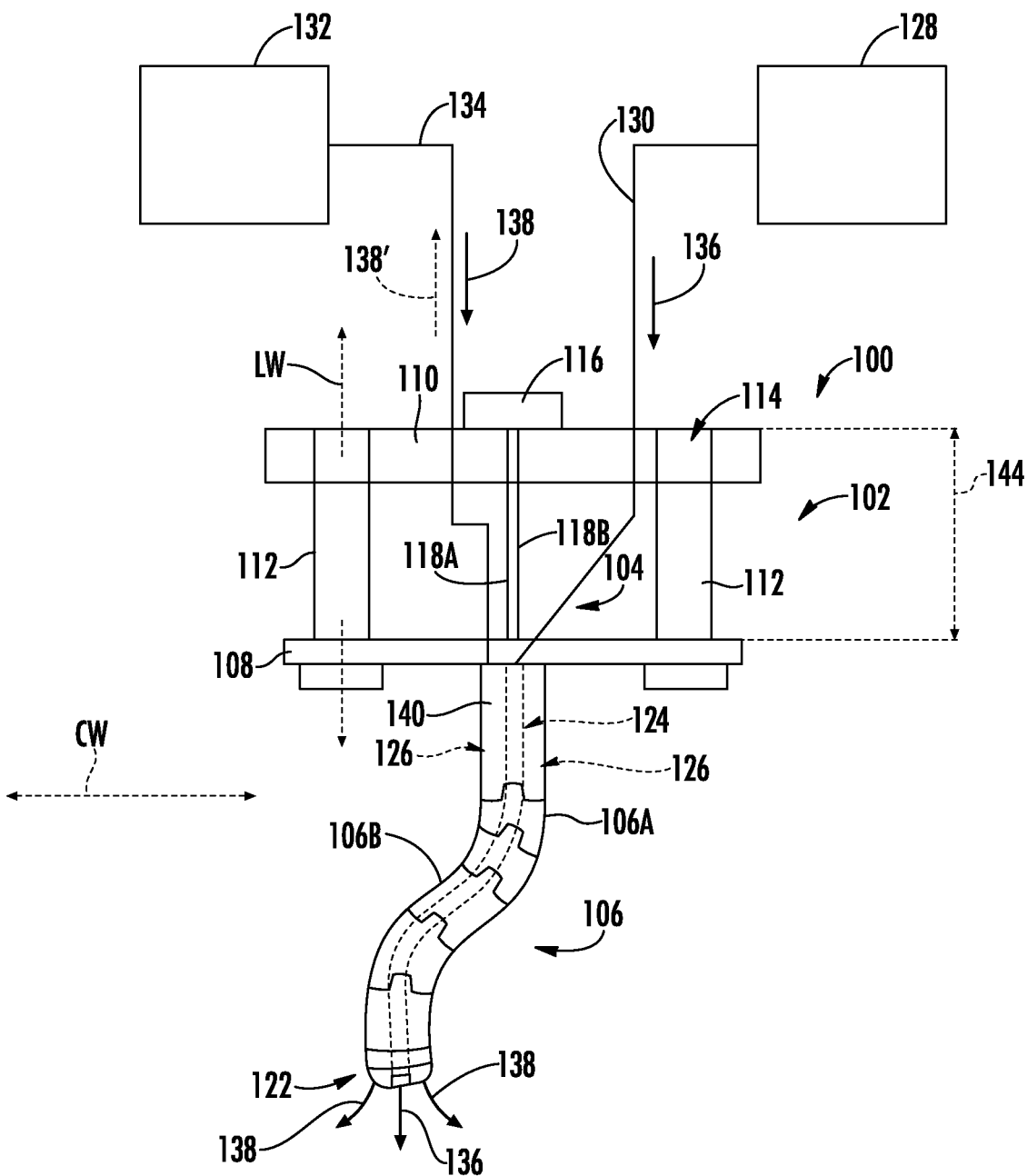
FIG. 2 is a schematic view of the exemplary extension tool of FIG. 1 in a tensioned position.

Referring now to the drawings, wherein identical numerals indicate the same elements throughout the Figs., FIG. 1 is a schematic view of an extension tool 100 in accordance with an exemplary embodiment of the present disclosure in a slacked position; and FIG. 2 is a schematic view of the exemplary extension tool 100 of FIG. 1 in a tensioned position. Accordingly, it will be appreciated from the description herein that the extension tool 100 is a selectively flexible extension tool.

The extension tool 100 generally includes a base 102, a line assembly 104, and a plurality of sequentially arranged links 106. The base 102 generally includes a first plate 108, a second plate 110, and one or more extension guides 112. For the embodiment depicted, the one or more extension guides 112 includes a pair of extension guides 112 fixedly coupled to the first plate 108 and extending in a lengthwise direction LW. The second plate 110 of the base 102 includes openings 114 corresponding to the pair of extension guides 112, such that the second plate 110 is slidable along the extension guides 112 in the lengthwise direction LW away from the first plate 108 and towards the first plate 108.

The line assembly 104 generally includes a root 116 coupled to the second plate 110 of the base 102 and a plurality of lines 118 extending from the root 116. The plurality of lines 118 includes a first line 118A and second line 118B. As will be appreciated from the discussion herein below, the line assembly 104, and in particular the first and second lines 118A, 118B, are operable with the plurality of sequentially arranged links 106 to move the plurality of sequentially arranged links 106 between the slacked position (FIG. 1) and the tensioned position (FIG. 2). Further, it will be appreciated that for the embodiment depicted, although the lines are depicted as being spaced from one another in a crosswise direction CW in the embodiment depicted for explanatory purposes, in at least certain embodiments they may be aligned with one another in the crosswise direction CW.

As will be explained in greater detail below, the plurality of sequentially arranged links 106 are spaced from one another when in the slacked position (FIG. 1) to allow the plurality of sequentially arranged links 106 to pivotably move relative to one another. By contrast, the plurality of sequentially arranged links 106 are pressed against one another when in the tensioned position (FIG. 2) to rigidly fix the plurality of sequentially arranged links 106 to one another.

For the embodiment of FIGS. 1 and 2, it will be appreciated that each of the plurality of links 106 are designed to result in a specific rigidized shape when the plurality of links 106 are moved to the tensioned position. For example, a first link 106A of the plurality of links 106 defines a first geometry (i.e., length, curvature, etc.) and a second link 106B of the plurality of links 106 defines a second geometry (i.e., link, curvature, etc.). The first geometry is different than the second geometry. In at least certain exemplary embodiments, in order to form the plurality of links 106 having specific geometries to facilitate a desired shape of the plurality of links 106, each of the plurality of links 106 may be formed through an additive manufacturing process (sometimes also referred to as 3D printing). Such may facilitate the formation of specifically shaped links 106 to be fitted within the plurality of links 106 of an extension tool 100 resulting in a desired shape when moved to the tensioned position, yet still remaining flexible enough to fit through an anticipated environment.

Further, with regard to the plurality of lines 118 of the line assembly 104, it will be appreciated that each of these lines 118 may be configured as cables, ropes, threads, etc. Accordingly, it will be appreciated that the lines 118 are generally flexible (i.e., will not significantly prevent the plurality of sequentially arranged links 106 from pivotably moving relative to one another in the slacked position). Further, one or more of the lines 118 may be formed of a metal material, such as a steel, tungsten, etc. Alternatively, however, the lines 118 may be formed of any other suitable material.

In at least certain exemplary embodiments, it will be appreciated that the extension tool 100 depicted in FIGS. 1 and 2 may include a tool implement coupled to one of the plurality of links 106. For example, the extension tool 100 defines a distal end 122, and the tool implement may be coupled to the link 106 at the distal end 122. In certain exemplary embodiments, the tool implement may include one or more sensors, cameras, or both, and additionally, or alternatively, may include one or more drills, laser tools, welding implements, rotatable implements (such as a Phillips head screwdriver bit, a flat head screwdriver bit, a Torx bit, Allen bit, Pozidrive, or the like), etc. In such a manner, the extension tool 100 may facilitate performing mechanical operations on a part at a remote location, or along an obscure vector within an environment (e.g., along a non-linear path within the environment) that would otherwise be more difficult.

With one or more of the configurations, the extension tool 100 may include a flexible driveshaft extending through an interior of the plurality of links 106, and more specifically, through a tube defined along a length of the plurality of links 106 (later described as a first passage).

It will further be appreciated, however, that in other embodiments, the extension tool 100 may be configured in any other manner to perform operations at a remote location, or along an obscure vector, within an environment.

Specifically, for the embodiment shown, the extension tool 100 is configured such that the plurality of sequentially arranged links 106 defines a passage therethrough when the plurality of sequentially arranged links 106 are in the tensioned position (FIG. 2).

More specifically, for the embodiment shown, the extension tool 100 is configured such that the plurality of sequentially arranged links 106 define a fluid flow passage therethrough when the plurality of sequentially arranged links 106 are in the tensioned position (FIG. 2). For the embodiment depicted, the passage is a fluid flow passage. However, in other embodiments, the passage may not be configured to provide a fluid flow and instead may be configured to, e.g., act as a guide tube for a tool.

It will be appreciated, that as used herein, the term "fluid flow passage" refers to any substantially continuous passage through the plurality of sequentially arranged links 106 when the plurality of sequentially arranged links 106 are in the tensioned position, capable of providing a gas or liquid flow to a location proximate the distal end 122 of the plurality of sequentially arranged links 106, or extracting a gas or liquid flow from a location proximate the distal end 122 of the plurality of sequentially arranged links 106.

More specifically, referring particular to FIG. 2, the plurality of sequentially arranged links 106 together define a first passage and a second passage, the second passage being separate from the first passage when the plurality of sequentially arranged links 106 are in the tensioned position. More specifically, still, for the embodiment shown, the first passage is a first fluid flow passage 124 and the second passage is a second fluid flow passage 126. However, as noted above, in other embodiments the first and/or second passage may not be configured to provide a fluid flow and instead may be configured to, e.g., act as a guide tube for a tool.

The second fluid flow passage 126 is separate from the first fluid flow passage 124 when the plurality of sequentially arranged links 106 are in the tensioned position. In such a manner, separate fluids may flow through the respective first and second fluid flow passages 124, 126. As will be appreciated from the description herein, and particularly from the embodiments described below, in at least certain exemplary embodiments, including the embodiment of FIG. 2, the first fluid flow passage 124 is an inner fluid flow passage and the second fluid flow passage 126 is an outer fluid flow passage. In such a manner, the inner fluid flow passage is positioned inward of the outer fluid flow passage, with the outer fluid flow passage substantially completely surrounding the inner fluid flow passage. As such, the outer fluid flow passage may define a generally annular shape surrounding the inner fluid flow passage.

However, in other exemplary embodiments, the first and second fluid flow passages 124, 126 may be arranged in any other suitable manner. For example, in other embodiments, the first and second fluid flow passages 124, 126 may instead run parallel and adjacent to one another, but may not be arranged concentrically (e.g., one of the first or second fluid flow passages 124, 126 extending along one side of the plurality of links 106 and the other of the first or second fluid flow passages 124, 126 extending along another side of the plurality of links 106).

Additionally, in still other embodiments, the plurality of sequentially arranged links 106 may only define one passage extending therethrough, or may not define any passages extending therethrough.

Referring still particularly to FIG. 2, it will be appreciated that the extension tool 100 further includes features for providing one or more fluid flows through the first fluid flow passage 124, the second fluid flow passage 126, or both. For example, for the embodiment of FIG. 2, the extension tool 100 further includes a first fluid flow device 128 fluidly coupled to the first fluid flow passage 124, the second fluid flow passage 126, or both.

In particular, for the embodiment of FIG. 2 the first fluid flow device 128 is fluidly coupled to the first fluid flow passage 124 through a first conduit 130, and the extension tool 100 further includes a second fluid flow device 132 fluidly coupled to the second fluid flow passage 126 through a second conduit 134. In certain embodiments, such as the embodiment shown, the first fluid flow device 128 generally includes a first pressurized fluid source for providing a first pressurized fluid flow 136 (shown schematically through conduit 130) through the first fluid flow passage 124. The first pressurized fluid flow 136 may be, e.g., a heated gas flow, a pressurized gas flow, a heated liquid flow, a pressurized liquid flow, etc.

Further for the embodiment of FIG. 2, the second fluid flow device 132 similarly includes a second pressurized fluid source for providing a second pressurized fluid flow 138 (shown schematically through conduit 134) through the second fluid flow passage 126. The second pressurized fluid 138 flow may include a different fluid flow than the first fluid flow 136 (e.g., a different gas, different liquid), may operate at a different temperature and/or pressure, etc.

For example, in certain exemplary embodiments the first pressurized fluid flow 136 may be a heated gas flow operating at a first temperature (such as a first initial temperature as measured at a base end of the plurality of links 106) and the second pressurized fluid flow 138 may similarly be a heated gas flow operating at a second temperature (such as a second initial temperature as measured at a base end of the plurality of links 106). The second temperature may be less than the first temperature to reduce a thermal gradient on a component on which the first and second pressurized fluid flows 136, 138 are directed. Additionally, or alternatively, the second temperature may be set to, e.g., ensure a thermal expansion of the first line 118A and the second line 118B of the line assembly 104 matches a thermal expansion of the plurality of links 106 during operation, thereby reducing a tension on the first and second lines 118A, 118B.

It will be appreciated, however, that in other exemplary embodiments, the extension tool 100 may operate in any other suitable manner. For example, as is depicted in phantom in FIG. 2, and other exemplary embodiments, the second pressurized fluid source of the second fluid flow device 132 may instead be a fluid pump for urging a second pressurized fluid flow 138' from the second fluid flow passage 126 in a direction opposite the first fluid flow 136. With such a configuration, the extension tool 100 may, e.g., ensure any leakage of a first pressurized fluid flow 136 through the first fluid flow passage 124 (e.g., between adjacent links 106) is captured and not leaked into the environment, and/or, may operate to suction up excess of the first pressurized fluid flow 136 at the distal end 122 of the plurality of sequentially arranged links 106. For example, the first pressurized fluid flow 136 may be a flow of oil or other lubrication being provided to a particular location within an environment, and the extension tool 100 may operate the second fluid flow passage 126 as a vacuum to suction up excess oil/lubrication at the particular location within the environment and further to capture any leakage from the first fluid flow passage 124.

Additionally, or alternatively, the extension tool 100 may not include separate fluid flow devices for the first and second fluid flow passages 124, 126. Instead, the first and second fluid flow passages 124, 126 may be fed from the same fluid flow source (e.g., the first fluid flow source 128). The fluid provided may be a heated fluid. The result may still be a first fluid flow 136 at the distal end 122 at a first temperature greater than a second temperature of a second fluid flow 138. Such may result from the second fluid flow effectively insulating the first fluid flow 136 and exchanging heat with the environment.

Referring again to both FIGS. 1 and 2, it will be appreciated that the line assembly 104 is operable with the plurality of sequentially arranged links 106 to move the plurality of sequentially arranged links 106 between the slacked position (FIG. 1) and tensioned position (FIG. 2). Specifically, the first line 118A and second line 118B of the line assembly 104 may be fixed to the link 106 at the distal end 122 of the plurality of sequentially arranged links 106. When the first line 118A and second line 118B of the line assembly 104 are tensioned by applying a tensioning force to the lines 118A, 118B (such that an amount of slack is taken out of the first and second lines 118A, 118B), the tensioning force in the first line 118A and second line 118B presses each of the plurality of sequentially arranged links 106 against one another, fixing the plurality of sequentially arranged links 106 in position to form a substantially rigid extension. Notably, for the embodiment show, the plurality of links 106 includes a base link 140 fixed to the base 102, allowing the first and second lines 118A, 118B to be pulled tight.

Briefly, it will also be appreciated that the first line 118A defines a first displacement when the plurality of sequentially arranged links 106 are moved from the slacked position to the tensioned position (i.e., the amount of slack taken out of the first line 118A), and similarly, the second line 118B defines a second displacement when the plurality of sequentially arranged links 106 are moved from the slacked position to the tensioned position (i.e., the amount of slack taken out of the second line 118B). More particularly, the first and second displacement may be measured by subtracting a first length 142 of the lines 118A, 118B between the plurality of links 106 and the root 116 (FIG. 1) when the links 106 are in the slacked position from a second length 144 of the lines 118A, 118B between the plurality of links 106 and the root 116 (FIG. 2) when the links 106 are in the tensioned position.

Figure 3:
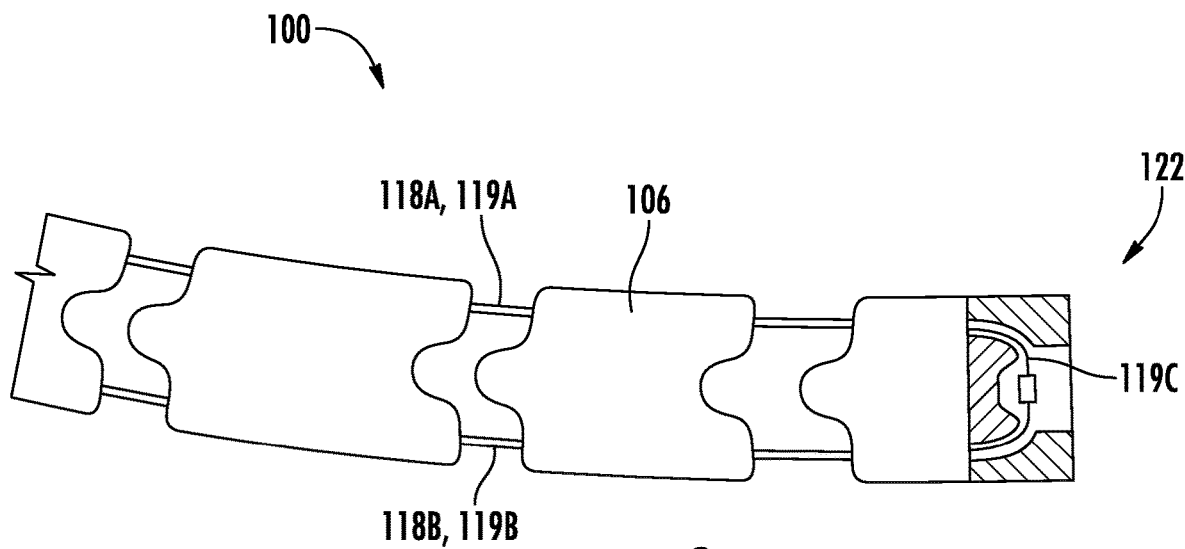
FIG. 3 is a schematic, cross sectional view of a distal end of the exemplary extension tool of FIG. 1.

Notably, as will be appreciated from the discussion hereinbelow, in at least certain exemplary embodiments, the first and second lines 118A and 118B may actually be first and second portions 119A, 119B of a continuous line 118, integral at the distal end 122. For example, referring now briefly to FIG. 3, a schematic view of the distal end 122 of the plurality of sequentially arranged links 106 is depicted, with a portion of the link 106 at the distal end cut-away for clarity. As shown, the first line 118A is a first portion 119A of a line extending through the plurality of sequentially arranged links 106 to the link 106 at the distal end 122, and the second line 118B is a second portion 119B of a line 118 similarly extending through the plurality of sequentially arranged links 106 to the link 106 at the distal end 122. The line further includes a transition portion 119C extending between the first and second portions 119A, 119B of the line 118 at the link 106 at the distal end 122. In such a manner, the line 118 loops around at the link 106 at the distal end 122. Such may allow for the line 118 to provide the tensioning force to move the links 106 to the tensioned position (FIG. 2). As will be discussed in more detail below, the extension tool 100 further includes attachment feature 190 coupled to or formed integrally with the line 118 of the line assembly 104 at the transition portion 119C of the line 118 to allow for the line 118 to support the links 106 in the event of a failure of the line 118.

Figure 4:
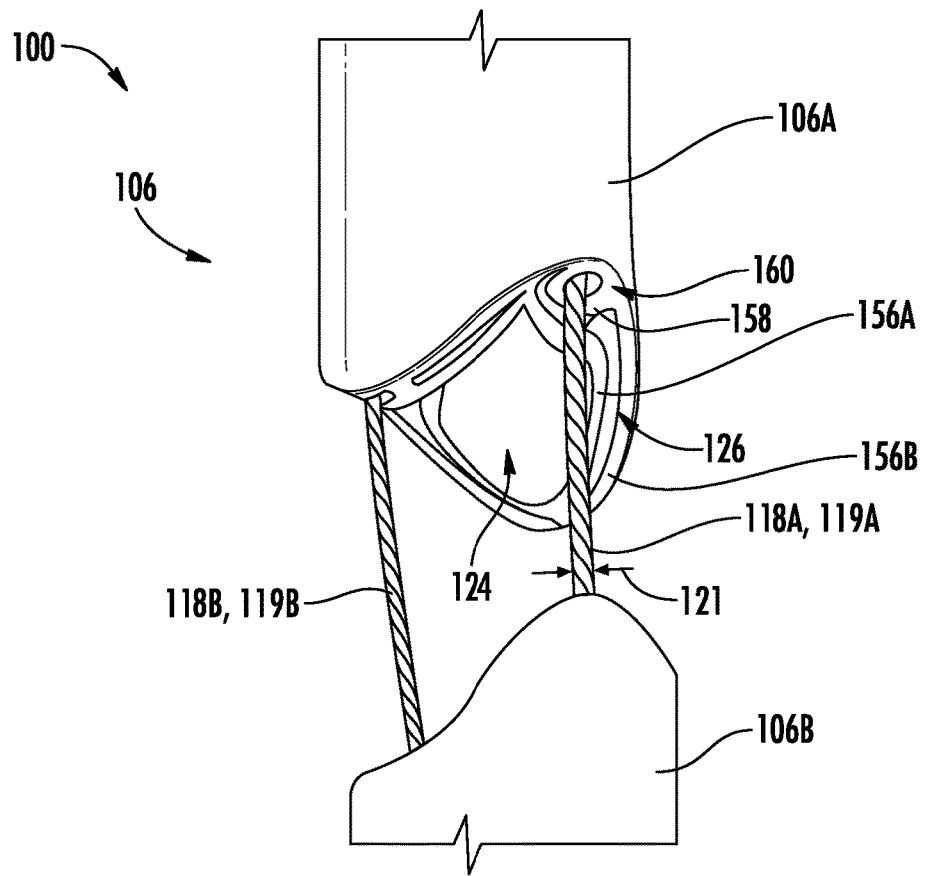
FIG. 4 is a close-up view of a junction between adjacent links of an extension tool in accordance with an exemplary embodiment of the present disclosure in a slacked position.
Figure 5:
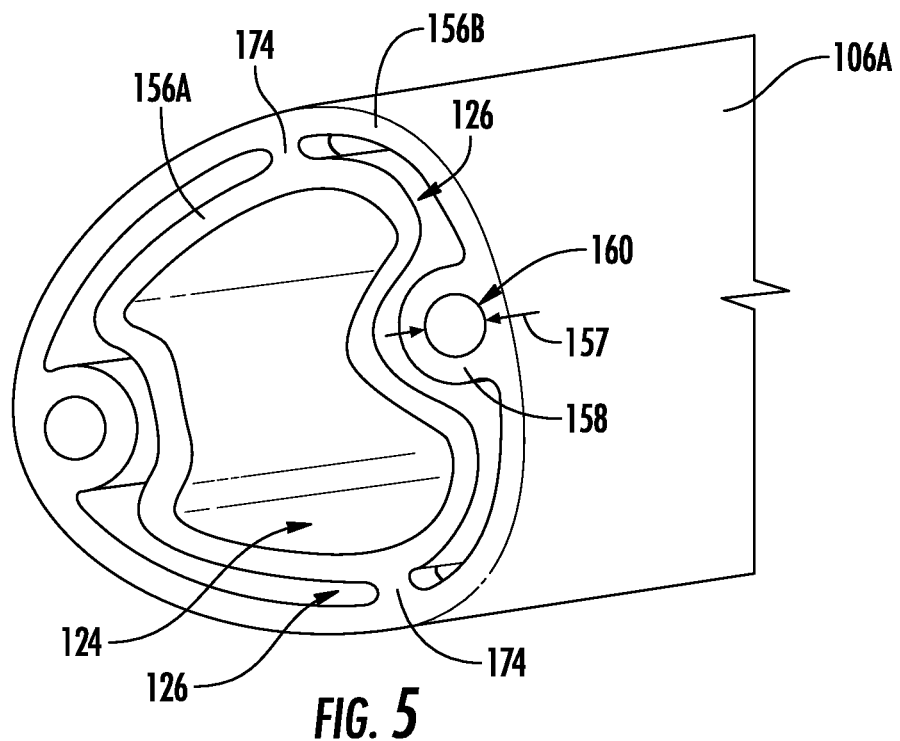
FIG. 5 is a close-up view of one end of one of the links of FIG. 4.

Referring now to FIGS. 4 and 5, exemplary aspects of the extension tool 100 described above with respect to FIGS. 1 and 2 are depicted. FIG. 4 depicts a close-up view of a junction between adjacent links 106 of the plurality of links 106 of the extension tool 100 depicted above in FIGS. 1 and 2, and FIG. 5 provides a close-up view of one end of one of the links 106 of FIG. 4.

As shown, a first link 106A in the plurality of sequentially arranged links 106 includes a wall 156. More specifically, for the embodiment shown, the first link 106A in the plurality of sequentially arranged links 106 includes a first wall 156A and a second wall 156B. The first wall 156A of the first link 106A defines in part the first fluid flow passage 124 and the second wall 156B of the first link 106A defines in part the second fluid flow passage 126. For the embodiment shown, the first wall 156A is an inner wall and the second wall 156B is an outer wall. The outer wall substantially completely surrounds the inner wall 156, such that the second fluid flow passage 126 is a generally annular passage surrounding the first fluid flow passage 124.

For the embodiment depicted, the second wall 156B is coupled to the first wall 156A through one or more point contacts 174 (see FIG. 5), such that the first and second wall 156A, 156B are not continuously connected along a length of each respective link 106. Specifically, for the embodiment shown, the one or more point contacts 174 are located at the ends of the links 106 (e.g., as first and second ends of each link 106). It will be appreciated that as used herein, the term "point contact" with reference to the connection between the first and second wall 156A, 156B of a respective link 106 refers to a connection that does not extend significantly along a length of the respective link, such as less than about 25% along a length of a respective link 106. For example, in certain exemplary embodiments, the point contacts 174 may extend less than about 15% along a length of a respective link 106, such as less than about 10% along a length of a respective link 106, such as less than about 5% along a length of a respective link 106. This embodiment represents an innovative solution to limit a thermal conduction path from outer wall 156B to inner wall 156A by providing a narrow connection element (i.e., point contacts 174).

However, in other embodiments, the first wall 156A may be coupled to the second wall 156B in any suitable manner. Additionally, or alternatively, in other embodiments, the plurality of links 106 may include any other suitable number of walls.

Further, it will be appreciated that the plurality of sequentially arranged links 106 include a plurality of line guides for the one or more of lines 118 of the line assembly 104. In particular, for the embodiment shown the line assembly 104 includes the first line 118A and the second line 118B, and the plurality of sequentially arranged links 106 similarly includes a first line guide 160 and a second line guide 164. Each link 106 includes a segment 158 of the first line guide 160 and segment 162 of the second line guide 164. For the embodiment shown, the line guides 160, 164 are positioned on an interior of the second wall 156B of each link 106 of the plurality of links 106.

It will be appreciated, however, that in other embodiments, the line guides may instead be located elsewhere, such as on an outside of the second wall 156B, on an outside of the first wall 156A, on an interior of the first wall 156A, or some combination thereof.

Referring still to FIGS. 4 and 5, it will be appreciated that the first and second line guides 160, 164 define a width 157 (i.e., a minimum cross-wise measure; see FIG. 5). Similarly, the portions 119A, 119B, 119C of the line 118 of the line assembly 104 each define a width 121 (see FIG. 4). The width 157 of the first and second line guides 160, 164 is slightly larger than the width 121 of the portions 119A, 119B, 119C of the line 118 of the line assembly 104 to accommodate some movement of the line 118 during operation of the extension tool 100, while still providing some constraint of the line 118.

It will further be appreciated from the discussion above that for the embodiments depicted and described, adjacent links 106 are sealed together by including mating geometries at their respective ends that are complementary in shape with the mating geometries of the adjacent links. The walls 156 of the links 106 are pressed together and the contact pressure applied by the lines 118 may form a contact seal therebetween to provide a seal between such links 106.

Figure 6:
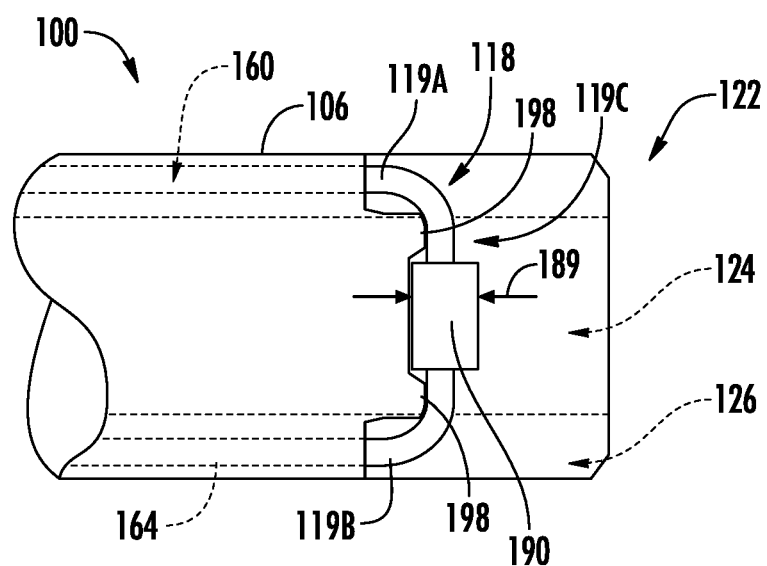
FIG. 6 is a close-up, schematic view of a link which may be part of a plurality of links of an extension tool in accordance with an exemplary embodiment of the present disclosure.

Further, referring now to FIG. 6, a close-up, schematic view of a link 106 of a plurality of links 106 of an extension tool 100 is provided at a distal end 122 of the plurality of links 106 in accordance with an exemplary embodiment of the present disclosure. The link 106 may accordingly be referred to as a distal link 106, and may be configured in accordance with one or more of the exemplary embodiments described above, or alternatively may be configured in accordance with any other suitable embodiment.

For the embodiment shown, the extension tool 100 includes a line 118 extending along a length thereof. Notably for the embodiment shown, the line 118 is configured as a single line 118 looped at the distal end 122. For this embodiment the line 118 includes a first portion 119A that is the first line 118A, a second portion 119B that is the second line 118B, a transition portion 119C at the distal end 122 extending between the first and second portions 119A, 119B of the line 118. As will be appreciated, the first portion 119A extends through the plurality of sequentially arranged links 106 to the distal link 106, and the second portion 119B similarly extends through the plurality of sequentially arranged links 106 to the distal link 106.

With such a configuration, in order to ensure both the first and second portions 119A, 119B of the line 118 do not completely pull out of the plurality of links 106 in the event of a failure of the line 118, the extension tool 100 includes an attachment feature 190 coupled to or formed integrally with the line 118 of the line assembly 104 at the transition portion 119C of the line 118 to support the line 118 in the event of a failure of the line 118. More specifically, the attachment feature 190 supports the line 118 in the event of a failure of the first portion 119A or the second portion 119B of the line 118. For example, as will be discussed in more detail below, if one portion of the line 118 breaks, the attachment feature 190 prevents the other portion of the line 118 from sliding through the line guides in the links 106, allowing the links 106 to scatter and fall apart within the environment.

Figure 7:
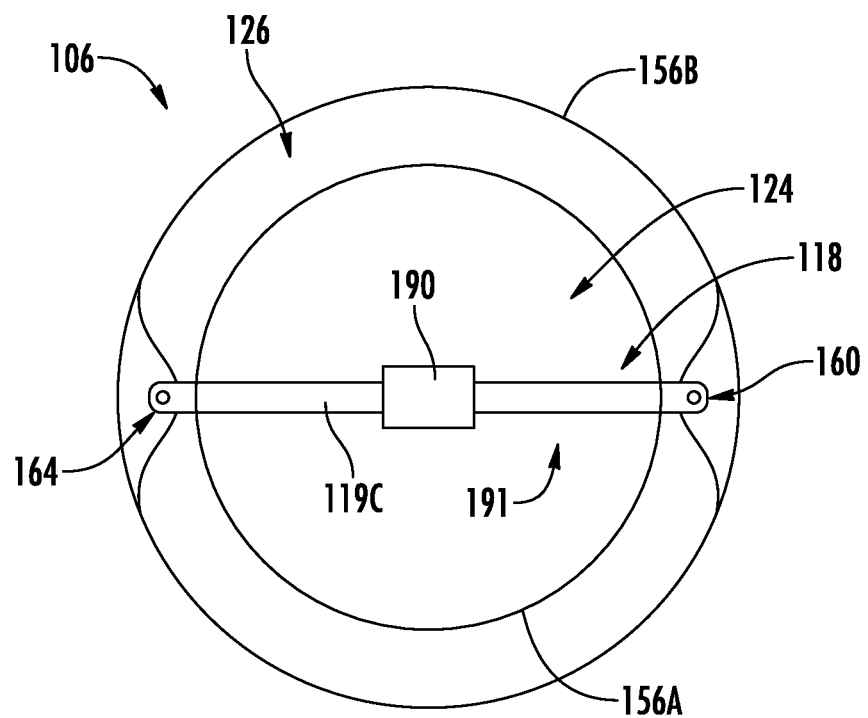
FIG. 7 is a schematic view of a downstream end of a link of a plurality of links of an extension tool in accordance with an exemplary embodiment of the present disclosure.
Figure 8:
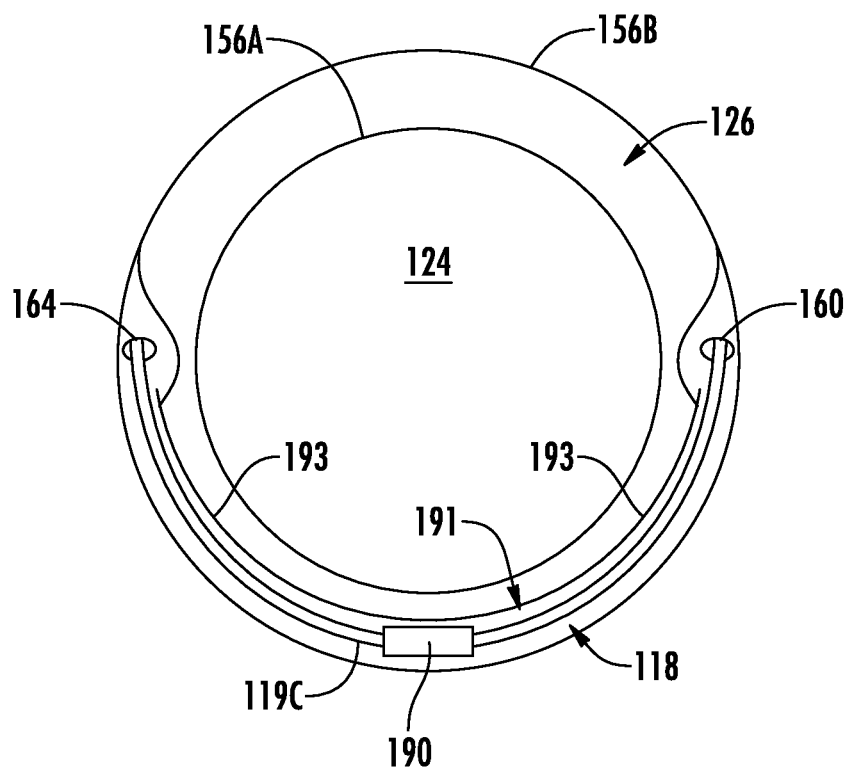
FIG. 8 is a schematic view of a downstream end of a link of a plurality of links of an extension tool in accordance with another exemplary embodiment of the present disclosure.

Referring briefly to FIGS. 7 and 8, two embodiments of a downstream end of the link 106 depicted in FIG. 6 is shown. As will be appreciated from prior discussions, in at least certain embodiments, the plurality of sequentially arranged links 106 defines a passage extending along a length thereof. More particularly, the plurality of sequentially arranged links 106 defines a first fluid flow passage 124 and a second fluid flow passage 126. Further, the distal link 106 defines a line path 191 along which the line 118 extends from the first line guide 160 to the second line guide 164.

Referring first to the embodiment of FIG. 7, the line path 191 extends through the passage defined by the plurality of sequentially arranged links 106, and more specifically extends through the first fluid flow passage 124 and through the second fluid flow passage 126. Additionally, for the embodiment of FIG. 7, the attachment feature 190 is positioned within the first fluid flow passage 124. Such a configuration may ensure the attachment feature 190 is not under significant tension during normal operations.

However, in other exemplary embodiments, the line path 191 may extend in any suitable manner. For example, referring now to the embodiment of FIG. 8, the line path 191 extends around the passage defined by the plurality of sequentially arranged links 106, and more specifically extends around the first fluid flow passage 124 and around the second fluid flow passage 126. For example, the distal link 106 includes a transition portion guide 193 along the second wall 156B such that the transition portion 119C of the line 118 and attachment feature 190 are isolated from a fluid flow within the first and second fluid flow passages 124, 126. Such may assist with maintaining an integrity of the line 118 and attachment feature 190 when a fluid flow through these passages may otherwise degrade the line 118 and/or attachment feature 190. Such may also reduce an impediment on the fluid flow through these passages.

Referring now back to FIG. 6, it will be appreciated that for the embodiment depicted, the attachment feature 190 defines a greater width 189 than the width 121 of the first and second lines 118A, 118B (see FIG. 4), and greater than the width 157 of the first and second line guides 160, 164 (see FIG. 5). In such a manner, the attachment feature 190 may prevent the first portion 119A or second portion 119B of the line 118 from pulling out through the respective first or second line guide 160, 164 in the event of a failure of the other of the first or second portion 119A, 119B of the line 118.

Notably, however, for the embodiment shown the attachment feature 190 may not be under any significant load during normal operations. For example, the line 118, and more particularly, the first and second portions 119A, 119B of the line 118, may be exposed to a maximum load during normal operations. The maximum load during normal operations refers to a maximum tension load during all rated operations of the extension tool 100. The attachment feature 190 may also be exposed to a maximum load during normal operations. The maximum load on the attachment feature 190 may be below twenty-five percent of the maximum load on the line 118 of the line assembly 104 during normal operation of the extension tool 100. For example, the maximum load on the attachment feature 190 may be below fifteen percent of the maximum load on the line 118 of the line assembly 104 during normal operation of the extension tool 100, such as below ten percent of the maximum load on the line 118 of the line assembly 104 during normal operation of the extension tool 100, such as below five percent of the maximum load on the line 118 of the line assembly 104 during normal operation of the extension tool 100.

More specifically, for the embodiment shown, the link 106 at the distal end includes support surfaces 198 to support the transition portion 119C of the line 118 as it extends between the first and second portions 119A, 119B, such that a load on the attachment feature 190 may be minimized. In such a manner, the attachment feature 190 may effectively float between the support surfaces 198. However, in the event of a failure of one of the first or second portions 119A, 119B of the line 118, the attachment feature 190 may be configured to abut against a respective line guide 160, 164 to prevent the portion of the line 118 remaining intact from sliding therethrough, allowing for the portion of the line 118 remaining intact to be used to remove the plurality of links 106 from the environment.

Figure 9:
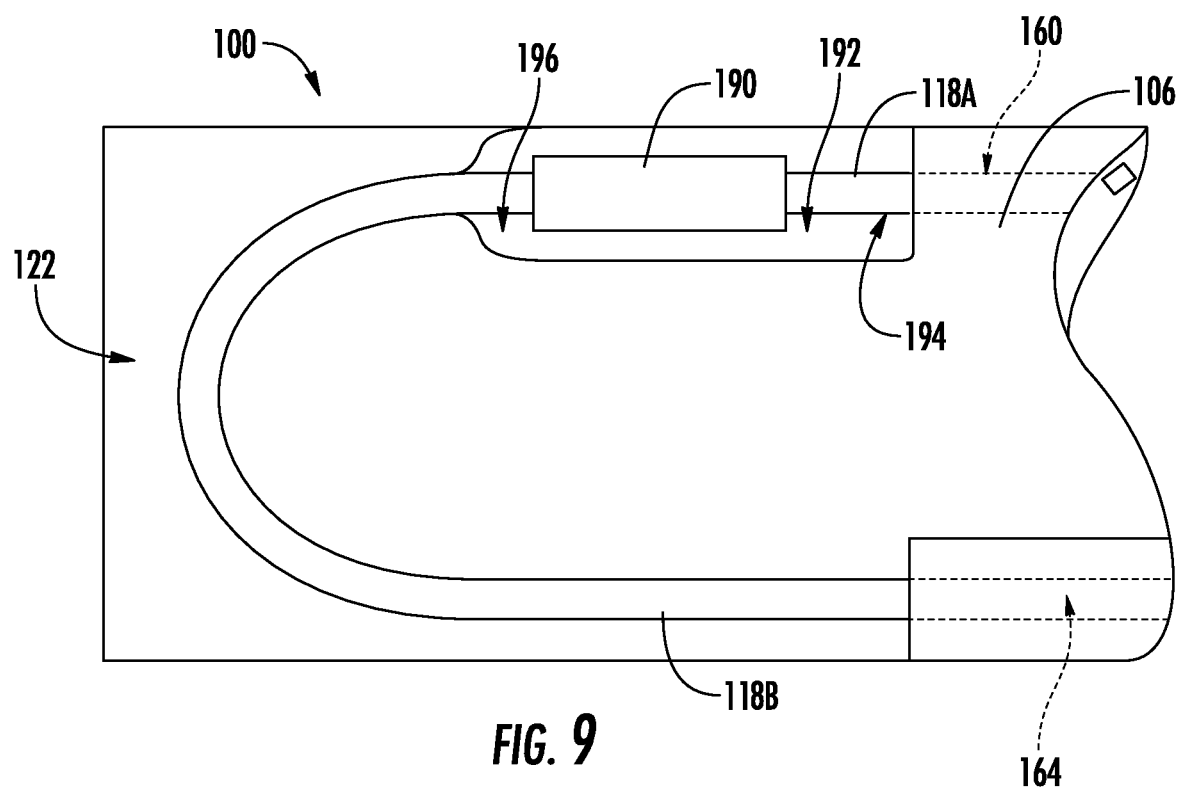
FIG. 9 is a close-up, schematic view of a link which may be part of a plurality of links of an extension tool in accordance with another exemplary embodiment of the present disclosure.

It will be appreciated, however, that the distal link 106 may have any other suitable configuration. For example, referring now to FIG. 9, another close-up, schematic view of a link 106 of a plurality of links 106 of an extension tool 100 is provided at a distal end 122 of the plurality of links 106 in accordance with an exemplary embodiment of the present disclosure. The link 106 depicted in FIG. 9 may be configured in a similar manner to the exemplary link 106 described above with respect to FIG. 6.

For example, the exemplary extension tool 100 depicted includes a plurality of sequentially arranged links 106 and a line assembly 104 having a line 118. The line 118 includes a first portion 119A extending through the plurality of sequentially arranged links to the distal link 106, a second portion 119B extending through the plurality of sequentially arranged links to the distal link 106, and a transition portion 119C extending between the first and second portions 119A, 119B. The extension tool 100 further includes an attachment feature 190 fixedly coupled to the line 118 at the transition portion 119C of the line 118.

However, for the embodiment show, the link 106 at the distal end 122 further defines an opening 192, with the transition portion 119C of the line 118 extending across the opening 192 and the attachment feature 190 located within the opening 192. The opening 192 defines a first shoulder 194 where the transition portion 119C of the line 118 enters across the opening 192 and a second shoulder 196 where the transition portion 119C of the line 118 exits across the opening 192. The attachment feature 190 is positioned between the first and second shoulders 194, 196, without touching the first and second shoulders 194, 196 during normal operation.

In such a manner, the load on the attachment feature 190 may be minimized. However, in the event of a failure of the first portion 119A of the line 118 or the second portion 119B of the line 118, the attachment feature 190 may abut against the first shoulder 194 or the second shoulder 196 to prevent the portion of the line 118 remaining intact from sliding through the respective line guides 160, 164, allowing for the portion of the line 118 remaining intact to be used to remove the plurality of links 106 from the environment.

Moreover, as noted above, the attachment feature 190 is fixedly coupled to the transition portion 119C of the lines 118. For example, referring now briefly to FIGS. 10 through 13, various embodiments of a line and attachment feature 190 are depicted. The lines 118 and attachment features 190 depicted in these Figs. may be incorporated into one or more of the exemplary embodiments described above.

Figure 10:
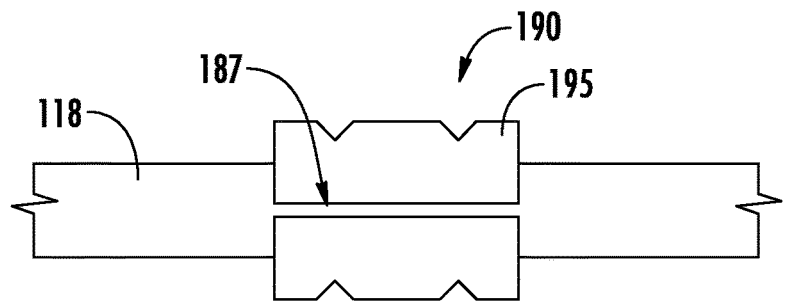
FIG. 10 is a schematic view of an attachment feature coupled to a line in accordance with an embodiment of the present disclosure.

FIGS. 10 through 13 depict various embodiments of an attachment feature 190 fixed to a line 118. For example, for the embodiment of FIG. 10, the attachment feature 190 is a casing 195 fixed to the transition portion 119C of the line 118. The casing 195 extends around a section of the transition portion 119C of the line 118 and for the embodiment depicted is crimped onto the transition portion 119C of the line 118 (as is indicated by the crimp indentations in the casing 195). The casing 195 may define a "C" shape allowing for the change in internal diameter when it is fixed to the transition portion 119C (and therefore defining a gap 187). Alternatively, the casing 195 may define an annular shape. Further, although two crimp indentations are shown in FIG. 10 spaced along a longitudinal direction, in other embodiments one or more longitudinal crimps may be provided, extending along all or a portion of a length of the casing 195.

Figure 11:
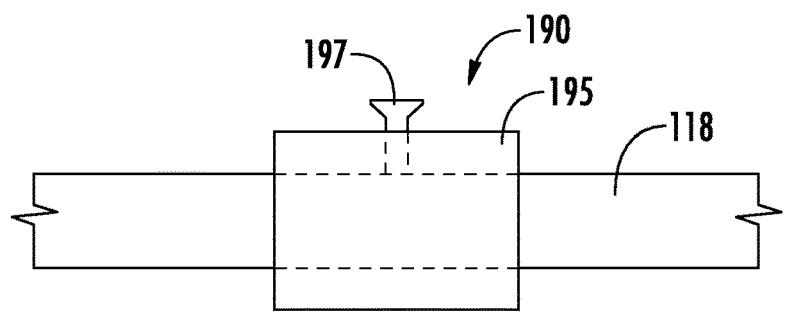
FIG. 11 is a schematic view of an attachment feature coupled to a line in accordance with another embodiment of the present disclosure.

For the embodiment of FIG. 11, the attachment feature 190 again includes a casing 195 fixed to the transition portion 119C of the line 118. However, for the embodiment depicted, the casing 195 is coupled to the transition portion 119C of the line 118 using a mechanical fastener 197. More specifically, the casing 195 is coupled to the transition portion 119C of the line 118 using screw or bolt extending through the casing 195 and pressing onto the line 118.

Figure 12:
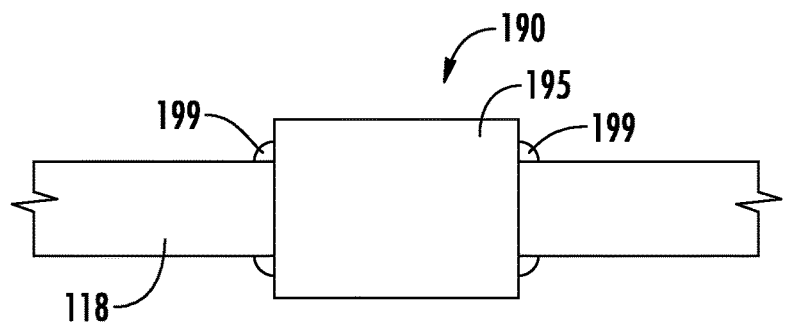
FIG. 12 is a schematic view of an attachment feature coupled to a line in accordance with yet another embodiment of the present disclosure.

For the embodiment of FIG. 12, the attachment feature 190 again includes a casing 195 fixed to the transition portion 119C of the line 118. However, for the embodiment depicted, the casing 195 is coupled to the transition portion 119C of the line 118 through welding, soldering, adhesive bonding, or a combination thereof Specifically, for the embodiment depicted, the casing 195 is coupled to the transition portion 119C of the line 118 through welding (as is indicated by the weld bead 199 depicted).

Figure 13:
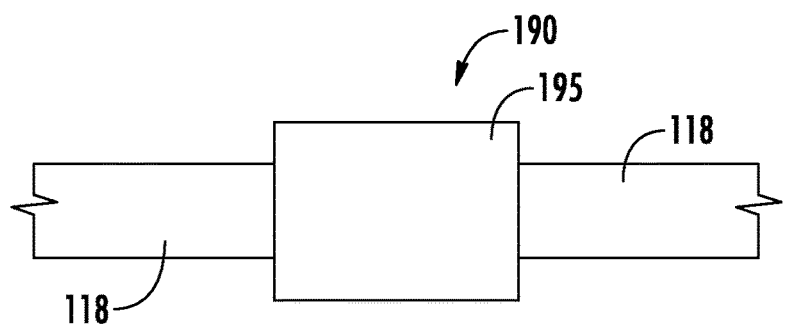
FIG. 13 is a schematic view of an attachment feature coupled to a line in accordance with still another embodiment of the present disclosure.

For the embodiment of FIG. 13, the attachment feature 190 again includes a casing 195 fixed to the transition portion 119C of the line 118. However, for the embodiment depicted, the casing 195 is formed onto the transition portion 119C of the line 118. For example, the casing 195 may be cast as a molten metal into a mold temporarily fixed around the line 118. Additionally or alternatively, the casing 195 may be permanently fixed around the line 118 as, e.g., a "Spelter socket" or the like.

It will be appreciated, however that in other exemplary embodiment the attachment feature 190 may be coupled to the line 118 in any other suitable manner.

Further, referring now to FIG. 14, one exemplary application of the various extension tools 100 of the present disclosure will be described. Specifically, FIG. 14 depicts an extension tool 100 in accordance with an exemplary embodiment of the present disclosure being utilized to navigate through a nonlinear path within an environment, which for the embodiment shown is a gas turbine engine 200.

Figure 14:
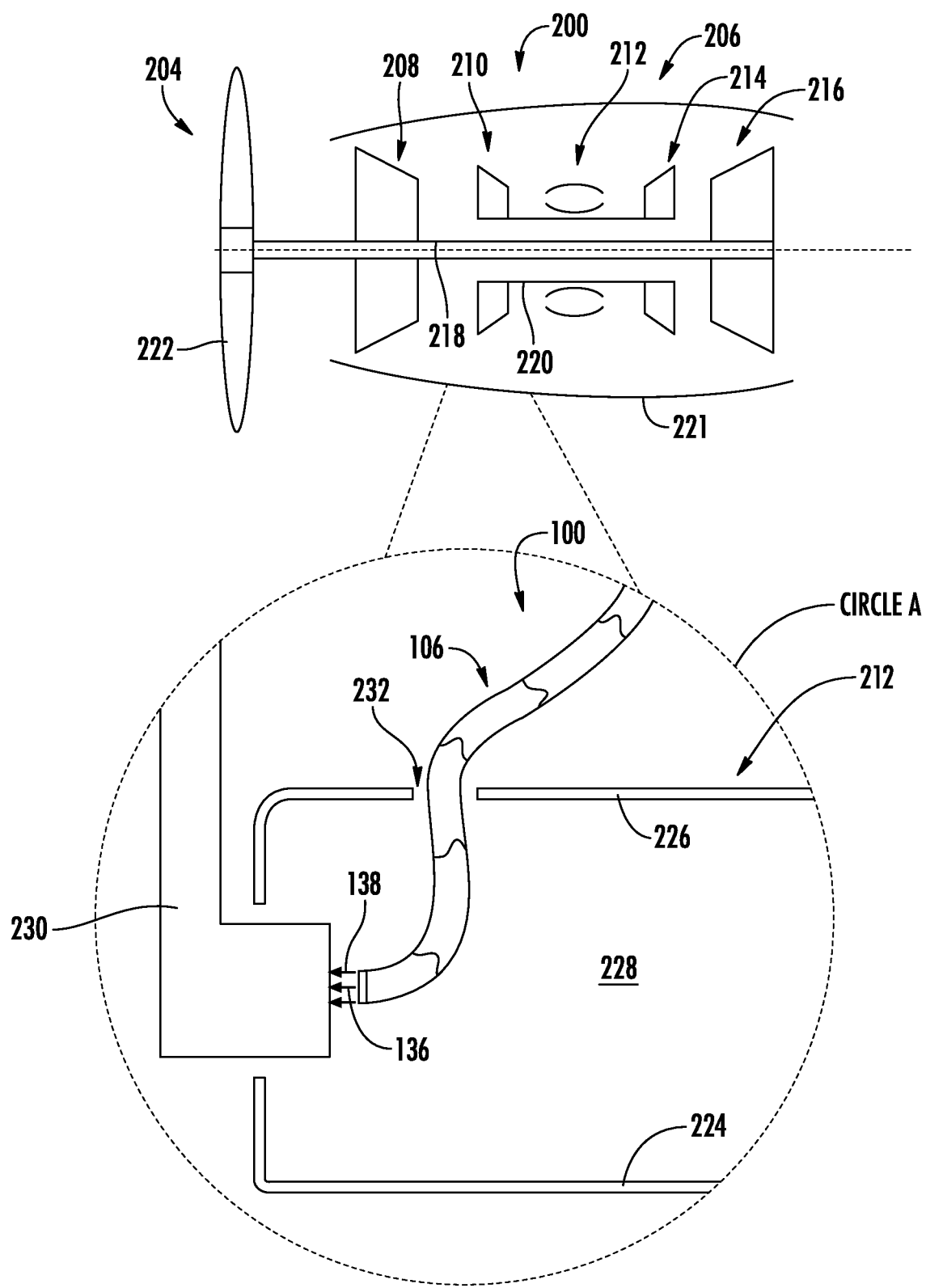
FIG. 14 is a schematic view of a gas turbine engine and extension tool in accordance with an exemplary embodiment of the present disclosure.

Specifically, for the embodiment of FIG. 14, the gas turbine engine 200 is configured as a turbofan engine. The turbofan engine generally includes a fan section 204 and a turbomachine 206.

The turbomachine 206 generally includes a compressor section having a low pressure ("LP") compressor 208 and a high pressure ("HP") compressor 210; a combustion section 212; a turbine section including an HP turbine 214 and an LP turbine 216; and an exhaust section (not shown). The compressor section, combustion section 212, turbine section, and exhaust section are each arranged in serial flow order. The LP compressor 208 and LP turbine 216 are coupled through an LP shaft 218, and similarly, the HP compressor 210 and HP turbine 214 are coupled to an HP shaft 220. Additionally, the turbomachine 26 includes a casing 221 enclosing at least in part the above-noted components of the turbomachine 206. Further, for the embodiment shown the fan section 204 includes a fan having a plurality of fan blades 222, with the fan and plurality of fan blades 222 being driven by the LP shaft 218.

In the callout Circle A, a close-up, schematic view of the combustion section 212 of the exemplary gas turbine engine 200 is provided. The combustion section 212 generally includes an inner liner 224 and an outer liner 226, together defining at least in part a combustion chamber 228. The combustion section 212 further includes a fuel nozzle 230 configured to provide, e.g., a mixture of fuel and compressed air to be combusted within the combustion chamber 228 during operation of the gas turbine engine 200. An igniter (not shown) may be positioned within an igniter hole 232 of the outer liner 226 for igniting the fuel and compressed air mixture.

After operating for an amount of time, an undesirable amount of coke buildup may form on or within the fuel nozzle 230. For example, during a shutdown of the gas turbine engine 200, fuel may remain within the fuel nozzle 230 and residual heat within the gas turbine engine 200 may cause the remaining fuel to coke. During, e.g., a maintenance interval, the extension tool 100 may be utilized to remove the buildup of coke on or within the fuel nozzle 230.

The exemplary extension tool 100 depicted may be configured in accordance with one or more of the exemplary embodiments described above with reference to FIGS. 1 through 12. For example, the exemplary extension tool may generally include a plurality of links 106 movable to a tensioned position (shown) having a nonlinear, two-dimensional or three-dimensional shape when in the tensioned position. Notably, the ability to additionally be moved to a slacked position may assist with moving the plurality of links 106 through the gas turbine engine 200 environment and through the igniter hole 232.

Further, the plurality of links 106 may together define a first fluid flow passage 124 (not shown) and a second fluid flow passage 126 (not shown). The extension tool 100 may be configured to provide a first gas flow 136 through the first fluid flow passage 124 and a second gas flow 138 through the second fluid flow passage 126. In order to remove the buildup of coke on or within the fuel nozzle 230, the first gas flow 136 may be a heated and pressurized gas flow defining a first operational temperature, and the second gas flow 138 may also be a heated and pressurized gas flow defining a second operational temperature. The first operational temperature may be sufficient to burn off the coke within the fuel nozzle 230. The second operational temperature may be less than the first operational temperature for heating to a lesser degree the area surrounding the coke buildup being burnt off to lessen a temperature gradient across the component.

Of course, in other embodiments, the extension tool 100 may be utilized for a myriad of different operations and functions, and further may have any other suitable configuration. For example, in other embodiments, the extension tool 100 may not define two fluid flow passages, or any fluid flow passages. Additionally, although the embodiments depicted show the extension tool 100 having a line assembly 104 with a single line 118 extending down and back along an entire length of the plurality of links 106 (i.e., including the first and second portions 119A, 119B), in other embodiments, the line assembly 104 may include any suitable number of lines 118 configured in any suitable manner. For example, the line assembly 104 may include at least two lines 118, with each extending down and back along an entire length of the plurality of links 106. Alternatively, one or more of the lines may not extend down and back along an entire length of the plurality of links 106, and may instead loop back at an intermediate location. Further, in still other embodiments, the line assembly 104 may include a line 118 that extends one way along a length of the plurality of links 106. This single line 118 may be anchored at the distal end 122 to a link 106, and may similarly include an attachment feature 190 as a secondary retention feature in the event the anchor breaks or there is some other failure.

Other embodiments are contemplated as well.

Figure 15:
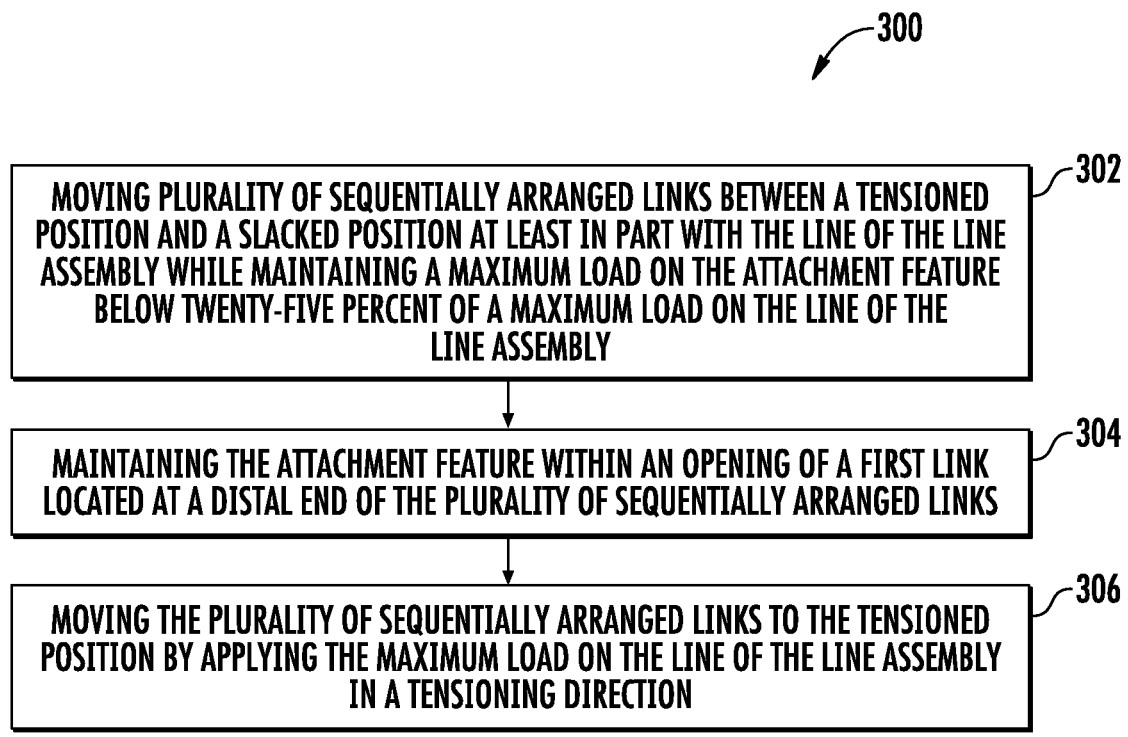
FIG. 15 is a flow diagram of a method for operating an extension tool in accordance with an exemplary aspect of the present disclosure.

Referring now to FIG. 15, a method 300 is provided for operating an extension tool. The method may utilize one or more of the exemplary extension tools described above with reference to FIGS. 1 through 13. Accordingly, for example, the extension tool may generally include a plurality of sequentially arranged links, a line assembly having a line extending along a length of the plurality of sequentially arranged links, and an attachment feature coupled to or formed integrally with the line of the line assembly.

The method 300 includes at (302) moving plurality of sequentially arranged links between a tensioned position and a slacked position at least in part with the line of the line assembly while maintaining a maximum load on the attachment feature below twenty-five percent of a maximum load on the line of the line assembly.

For the exemplary aspect depicted, moving the plurality of sequentially arranged links between the tensioned position and the slacked position at (302) includes at (304) maintaining the attachment feature within an opening of a first link located at a distal end of the plurality of sequentially arranged links. Further for the exemplary aspect depicted, moving the plurality of sequentially arranged links between the tensioned position and the slacked position at (302) includes at (306) moving the plurality of sequentially arranged links to the tensioned position by applying the maximum load on the line of the line assembly in a tensioning direction.

Although not depicted, additional selectively flexible tools may be utilized in additional exemplary aspects of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

An extension tool including a plurality of sequentially arranged links moveable relative to one another, the plurality of sequentially arranged links including a first link; a line assembly comprising a line, the line including a first portion extending through the plurality of sequentially arranged links to the first link and a transition portion extending from the first portion through the first link; and an attachment feature coupled to or formed integrally with the line of the line assembly at the transition portion of the line to support the line in the event of a failure of the line.

The extension tool of any preceding clause, wherein the line further comprises a second portion extending through the plurality of sequentially arranged links to the first link, wherein the transition portion extends between the first portion and the second portion at the first link, and wherein attachment feature supports the line in the event of a failure of the first portion or the second portion of the line.

The extension tool of any preceding clause, wherein the attachment feature is a casing fixed to the transition portion of the line.

The extension tool of any preceding clause, wherein the casing is crimped onto the transition portion of the line.

The extension tool of any preceding clause, wherein the casing is coupled to the transition portion of the line using a mechanical fastener.

The extension tool of any preceding clause, wherein the casing is coupled to the transition portion of the line through welding, soldering, adhesive bonding, or a combination thereof.

The extension tool of any preceding clause, wherein the plurality of links defines a distal end, and wherein the first link is positioned at the distal end.

The extension tool of any preceding clause, wherein the first link defines an opening, wherein the transition portion of the line extends across the opening, and wherein the attachment feature is positioned within the opening.

The extension tool of any preceding clause, wherein the first link comprises a first shoulder defining in part the opening where the line enters across the opening and a second shoulder also defining in part the opening where the line exits across the opening, wherein the attachment feature is spaced between the first and second shoulders.

The extension tool of any preceding clause, wherein the attachment feature defines a first width, wherein the line defines a second width, and wherein the first width is greater than the second width.

The extension tool of any preceding clause, wherein the first link comprises a first line guide with the first portion of the line extending therethrough, wherein the first line guide defines a third width, and wherein the third width is greater than the second width and less than the first width.

The extension tool of any preceding clause, wherein the plurality of sequentially arranged links defines a passage extending along a length thereof, wherein the first link of the plurality of links defines a line path for the transition portion of the line, wherein the line path extends through the passage defined by the plurality of sequentially arranged links.

The extension tool of any preceding clause, wherein the plurality of sequentially arranged links defines a passage extending along a length thereof, wherein the first link of the plurality of links defines a line path for the transition portion of the line, wherein the line path extends around the passage defined by the plurality of sequentially arranged links.

The extension tool of any preceding clause, wherein the line assembly is operable with the plurality of sequentially arranged links to move the plurality of sequentially arranged links between a slacked position and a tensioned position, wherein the plurality of sequentially arranged links are rigidly fixed to one another when in the tensioned position.

The extension tool of any preceding clause, wherein each link of the plurality of sequentially arranged links includes a first wall, wherein the first wall comprises a first line guide and a second line guide, wherein the first portion of the line extends through the first line guide, and wherein a second portion of the line extends through the second line guide.

The extension tool of any preceding clause, wherein the attachment feature is larger than an opening of the first line guide and larger than an opening of the second line guide.

The extension tool of any preceding clause, wherein a maximum load on the attachment feature during normal operation of the extension tool is below twenty-five percent of a maximum load on the line of the line assembly during normal operation of the extension tool.

A method of operating an extension tool, the extension tool comprising a plurality of sequentially arranged links, a line assembly having a line extending along a length of the plurality of sequentially arranged links, and an attachment feature coupled to or formed integrally with the line of the line assembly, the method comprising: moving plurality of sequentially arranged links between a tensioned position and a slacked position at least in part with the line of the line assembly while maintaining a maximum load on the attachment feature below twenty-five percent of a maximum load on the line of the line assembly.

The method of any preceding clause, wherein moving the plurality of sequentially arranged links between the tensioned position and the slacked position comprises maintaining the attachment feature within an opening of a first link located at a distal end of the plurality of sequentially arranged links.

The method of any preceding clause, wherein moving the plurality of sequentially arranged links between the tensioned position and the slacked position comprises moving the plurality of sequentially arranged links to the tensioned position by applying the maximum load on the line of the line assembly in a tensioning direction.

What is claimed is:
1. An extension tool comprising:
a plurality of sequentially arranged links moveable relative to one another, the plurality of sequentially arranged links including a first link,
a line assembly comprising a line, the line including a first portion extending through the plurality of sequentially arranged links to the first link and a transition portion extending from the first portion through the first link; and
an attachment feature coupled to or formed on the line of the line assembly at the transition portion of the line to support the line in an event of a failure of the line;
wherein the first link defines an opening, wherein the transition portion of the line extends across the opening, and wherein the attachment feature is positioned within the opening and is free to move together with the line within the opening.

2. The extension tool of claim 1, wherein the line further comprises a second portion extending through the plurality of sequentially arranged links to the first link, wherein the transition portion extends between the first portion and the second portion at the first link, and wherein the attachment feature supports the line in the event of a failure of the first portion or the second portion of the line.

3. The extension tool of claim 1, wherein the attachment feature is a casing fixed to the transition portion of the line.

4. The extension tool of claim 3, wherein the casing is crimped onto the transition portion of the line.

5. The extension tool of claim 3, wherein the casing is coupled to the transition portion of the line using a mechanical fastener.

6. The extension tool of claim 3, wherein the casing is coupled to the transition portion of the line through welding, soldering, adhesive bonding, or a combination thereof.

7. The extension tool of claim 1, wherein the plurality of sequentially arranged links defines a distal end, and wherein the first link is positioned at the distal end.

8. The extension tool of claim 1, wherein the first link comprises a first shoulder defining in part the opening where the line enters across the opening and a second shoulder also defining in part the opening where the line exits across the opening, wherein the attachment feature is spaced between the first shoulder and the second shoulder.

9. The extension tool of claim 1, wherein the attachment feature defines a first width, wherein the line defines a second width, and wherein the first width is greater than the second width.

10. The extension tool of claim 9, wherein the first link comprises a first line guide with the first portion of the line extending therethrough, wherein the first line guide defines a third width, and wherein the third width is greater than the second width and less than the first width.

11. The extension tool of claim 1, wherein the plurality of sequentially arranged links defines a passage extending along a length thereof, wherein the first link of the plurality of sequentially arranged links defines a line path for the transition portion of the line, wherein the line path extends through the passage defined by the plurality of sequentially arranged links.

12. The extension tool of claim 1, wherein the plurality of sequentially arranged links defines a passage extending along a length thereof, wherein the first link of the plurality of sequentially arranged links defines a line path for the transition portion of the line, wherein the line path extends around the passage defined by the plurality of sequentially arranged links.

13. The extension tool of claim 1, wherein the line assembly is operable with the plurality of sequentially arranged links to move the plurality of sequentially arranged links between a slacked position and a tensioned position, wherein the plurality of sequentially arranged links are rigidly fixed to one another when in the tensioned position.

14. The extension tool of claim 1, wherein each link of the plurality of sequentially arranged links includes a first wall, wherein the first wall comprises a first line guide and a second line guide, wherein the first portion of the line extends through the first line guide, and wherein a second portion of the line extends through the second line guide.

15. The extension tool of claim 14, wherein the attachment feature is larger than an opening of the first line guide and larger than an opening of the second line guide.

16. The extension tool of claim 1, wherein a maximum load on the attachment feature during normal operation of the extension tool is below twenty-five percent of a maximum load on the line of the line assembly during normal operation of the extension tool.

17. An extension tool comprising:
a plurality of sequentially arranged links,
a line assembly having a line extending along a length of the plurality of sequentially arranged links, and
an attachment feature coupled to or formed on the line of the line assembly,
wherein the attachment feature is positioned within an opening in one of the links and does not contact a surface of the opening during normal operation of the extension tool.

18. The extension tool of claim 17, wherein the opening is located in a first link located at a distal end of the plurality of sequentially arranged links.

19. The extension tool of claim 17, wherein the attachment feature is allowed to move along with the line within the opening.

20. The extension tool of claim 17, wherein the line assembly is operable with the plurality of sequentially arranged links to move the plurality of sequentially arranged links between a slacked position and a tensioned position, wherein the plurality of sequentially arranged links are rigidly fixed to one another when in the tensioned position.

21. An extension tool comprising:
a plurality of sequentially arranged links,
a line assembly having a line extending along a length of the plurality of sequentially arranged links, the line assembly operable with the plurality of sequentially arranged links to move the plurality of sequentially arranged links between a slacked configuration and a tensioned configuration,
a line guide of one of the plurality of sequentially arranged links through which the line extends, and
an attachment feature coupled to or formed on the line of the line assembly that is spaced from the line guide during normal operation of the extension tool, the attachment feature configured to abut against the line guide in an event of failure of the line.

* * * * *